United States Patent
George

(10) Patent No.: US 9,409,083 B2
(45) Date of Patent: Aug. 9, 2016

(54) SPAWNING NEW TIMELINES DURING GAME SESSION REPLAY

(71) Applicant: Amazon Technologies, Inc., Reno, NV (US)

(72) Inventor: Michael Martin George, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 216 days.

(21) Appl. No.: 14/318,093

(22) Filed: Jun. 27, 2014

(65) Prior Publication Data

US 2015/0375102 A1  Dec. 31, 2015

(51) Int. Cl.
*A63F 13/497* (2014.01)
*A63F 13/00* (2014.01)

(52) U.S. Cl.
CPC .................................... *A63F 13/00* (2013.01)

(58) Field of Classification Search
CPC .. A63F 13/49; A63F 13/497; A63F 2300/634
USPC .......................................................... 463/24
See application file for complete search history.

(56) References Cited

U.S. PATENT DOCUMENTS

| | | |
|---|---|---|
| 5,261,820 A | 11/1993 | Slye |
| 5,395,242 A | 3/1995 | Slye |
| 5,682,196 A | 10/1997 | Freeman |
| 6,173,260 B1 | 1/2001 | Slaney |
| 6,275,806 B1 | 8/2001 | Pertrushin |
| 7,451,079 B2 | 11/2008 | Oudeyer |
| 7,606,701 B2 | 10/2009 | Degani et al. |
| 7,803,052 B2 | 9/2010 | Multerer |
| 7,940,914 B2 | 5/2011 | Petrushin |
| 8,078,470 B2 | 12/2011 | Levanon et al. |
| 8,096,863 B2 | 1/2012 | Annunziata |
| 8,308,562 B2 | 11/2012 | Patton |

(Continued)

FOREIGN PATENT DOCUMENTS

| | | |
|---|---|---|
| WO | 9922364 | 5/1999 |
| WO | 2007098560 | 9/2007 |

(Continued)

OTHER PUBLICATIONS

International Search Report and Written Opinion from PCT/US2015/037860, Date of Mailing Aug. 10, 2015, Amazon Technologies, Inc., pp. 1-13.

(Continued)

*Primary Examiner* — Allen Chan
(74) *Attorney, Agent, or Firm* — Robert C. Kowert; Meyertons, Hood, Kivlin, Kowert & Goetzel, P.C.

(57) ABSTRACT

A game system in which game sessions involving one or more players may be recorded and saved as game records. A previously recorded game session may be selected and replayed. However, in addition to providing a static replay of the game session, the game system may allow one or more players to step into and assume control of respective game characters at any point during the replay of the game session. When a player steps into and takes control of game a character during the playback, a new timeline is spawned from the original timeline with potentially different outcomes, and a new game record corresponding to the new timeline is generated and stored.

26 Claims, 18 Drawing Sheets

(56) References Cited

U.S. PATENT DOCUMENTS

| | | | |
|---|---|---|---|
| 2008/0300700 | A1 | 12/2008 | Hammer et al. |
| 2012/0052476 | A1 | 3/2012 | Graesser et al. |
| 2012/0184353 | A1* | 7/2012 | Anderson ............... G07F 17/32 463/25 |
| 2014/0171039 | A1 | 6/2014 | Bjontegard |
| 2014/0194211 | A1* | 7/2014 | Chimes ................. A63F 13/497 463/43 |
| 2015/0139610 | A1 | 5/2015 | Syed et al. |

FOREIGN PATENT DOCUMENTS

| | | |
|---|---|---|
| WO | 2009/073828 | 6/2009 |
| WO | 2014061015 | 4/2014 |
| WO | 2014122416 | 8/2014 |

OTHER PUBLICATIONS

Wikipedia, "StarCraft II: Heart of the Swarm", Jul. 30, 2015, Retrieved from the Internet: URL: http://en.wikipedia.org/wiki/StarCraft_II:_Heart_of_the_Swarm, pp. 1-10.

Blizzard Entertainment, "New Replay and Resume Features Coming in Heart of the Swarm", Jan. 24, 2013, Retrieved from the Internet: URL: http://us.battle.net/sc2/en/blog/8501413/new-replay-and-resume-features-coming-in-heart-of-the-swarm-Jan.24, 2013, pp. 1-4.

"In the Heart of the Swarm, Battle.net Gets Revamped-David Kim Interview", Jun. 15, 2012, Retrieved from the Internet: URL: https://web.archive.org/web/20130526082708/http://www/rtsguru.com/game/406/article/3262/In-Heart-of-the-Swarm-Battle.net-Gets-Revamped-David-Kim-Interview.html, pp. 1-4.

"New means of practice with "Resume from replay"?", Jun. 15, 2012, Retrieved from the Internet: URL: http://www.teamliquid.net/forum/starcraft-2/345201-new-means-of-practice-with-resume-from-replay, pp. 1-4.

"Drivatar(TM) in Forza Motorsport-Microsoft Research", Apr. 19, 2014, Retrieved from the Internet: URL: https://web.arichive.com/web/20140419214009/http://research.microsoft.com/en-us/projects/drivatar/forza.aspx, pp. 1-6.

U.S. Appl. No. 14/500,413, filed Sep. 29, 2014, Collin Charles Davis.
U.S. Appl. No. 14/500,451, filed Sep. 29, 2014, Michael Anthony Frazzini.
U.S. Appl. No. 14/500,619, filed Sep. 29, 2014, Christian Robert Cabanero.
U.S. Appl. No. 14/500,593, filed Sep. 29, 2014, Christian Robert Cabanero.
U.S. Appl. No. 14/500,600, filed Sep. 29, 2014, Christian Robert Cabanero.
U.S. Appl. No. 14/500,580, filed Sep. 29, 2014, Christian Robert Cabanero.

Wang, Jinjun, et al., "Sports highlight detection from keyword sequences using HMM", Multimedia and Expo, 2004, ICME'04, IEEE International Conference, pp. 1-5, vol. 1.

Ren, et al., "Affective sports highlight detection", 15th European Signal Processing Conference, Sep. 3-7, 2007, pp. 728-732.

Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.

Changsheng Xu, et al., "Live Sports Even Detection Based on Broadcast Video and Web-casting Text", Proceedings of the 14th annual ACM international conference on Multimedia, ACM, 2006, pp. 221-230.

U.S. Appl. No. 14/754,584, filed Jun. 29, 2015, Michael Anthony Willette, et al.
U.S. Appl. No. 14/754,575, filed Jun. 29, 2015, Michael Anthony Willette, et al.
U.S. Appl. No. 14/732,580, filed Jun. 5, 2015, Ethan Zane Evans, et al.
U.S. Appl. No. 14/732,582, filed Jun. 5, 2015, Ethan Zane Evans, et al.
U.S. Appl. No. 14/755,922, filed Jun. 30, 2015, David Hendrik Verfaillie et al.
U.S. Appl. No. 14/755,905, filed Jun. 30, 2015, Michael Anthony Willette et al.
U.S. Appl. No. 14/755,955, filed Jun. 30, 2015, Christopher Paul Duly et al.
U.S. Appl. No. 14/755,934, filed Jun. 30, 2015, Rohit Garg et al.
U.S. Appl. No. 14/755,944, filed Jun. 30, 2015, Robert Harvey Oates.
U.S. Appl. No. 14/755,967, filed Jun. 30, 2015, Patrick Gilmore et al.
U.S. Appl. No. 14/755,974, filed Jun. 30, 2015, Hok Peng Leung et al.
U.S. Appl. No. 14/318,042, filed Jun. 27, 2014, Gerald Joseph Heinz et al.

Mehdi Kaytoue, et al. "Watch me playing, I am a professional: a first study on video game live streaming", Proceedings of the 21st international conference companion on World Wide Web, ACM, 2012, pp. 1-8.

Gifford Cheung, et al., "Starcraft from the stands: understanding the game spectator", Proceedings of the SIGCHI Conference on Human Factors in Computing Systems, ACM, 201, pp. 1-10.

Thomas P. B. Smith, et al."Live-streaming changes the (video) game." Proceedings of the 11th European conference on Interactive TV and video. ACM, 2013, pp. 131-138.

William A. Hamilton, et al., "Streaming on twitch: fostering participatory communities of play within live mixed media." Proceedings of the SIGCHI Conference on Human Factors in Computing Systems. ACM, 2014, pp. 1-10.

Wang, Jue, et al. "Interactive video cutout." ACM Transactions on Graphics (TOG). vol. 24. No. 3. ACM, 2005, pp. 585-594.

Smolic, Aljoscha, et al. "3d video and free viewpoint video-technologies, applications and mpeg standards." Multimedia and Expo, 2006 IEEE International Conference on. IEEE, 2006, pp. 1-56.

Karsten Muller, et al. "View synthesis for advanced 3D video systems." EURASIP Journal on Image and Video Processing 2008 (2009), pp. 1-11.

Ballan, Luca, et al. "Unstructured video-based rendering: Interactive exploration of casually captured videos." ACM Transactions on Graphics (TOG) 29.4 (2010): 87, pp. 1-10.

Smolic, Aljoscha, Hideaki Kimata, and Anthony Vetro. "Development of MPEG standards for 3D and free viewpoint video." Optics East 2005. International Society for Optics and Photonics, 2005, pp. 1-13.

Amazon Web Services, "Amazon AppStream Developer Guide", Nov. 13, 2013, pp. 1-200.

M.A. Anusuya, et al., "Speech Recognition by Machine: A Review", International Journal of Computer Science and Information Security, 2009, pp. 181-205, vol. 6, No. 3.

Frank Dellaert, et al., "Recgonizing Emotion in Speech", IEEE, Spoken Language, 1996, pp. 1-4 Proceedings., Fourth International Conference on. vol. 3.

Santosh K. Gaikwad, et al., "A Review on Speech Recognition Technique", International Journal of Computer Applications, Nov. 2010, pp. 16-24, vol. 10, No. 3.

Kiel Mark Gilleade, et al., "Afftective Videogames and Modes of Affectived Gaming: Assist me, Challenge Me, Emote Me", Proceedings of DiGRA 2005 Conference, 2005, pp. 1-7.

Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.

Christian Martyn Jones, et al., "Creating an emotionally reactive computer game responding to affective cues in speech", HCI Proceedings, 2005, pp. 1-2, vol. 2.

Paul P.A.B. Merkx, et al., "Inducing and Measuring Emotion through a Multiplayer First-Person Shooter Computer Game", Proceedings of the Computer Games Workshop, 2007, pp. 1-12.

Alan Murphy, Dr. Sam Redfern. "Utilizing Bimodal Emotion Recognition for Adaptive Artificial Intelligence." International Journal of Engineering Science and Innovative Technology (IJESIT), Jul. 2013, pp. 167-173, vol. 2, Issue 4.

Bjorn Schuller, et al., "Acoustic Emotion Recognition: A Benchmark Comparison of Performances", IEEE, ASRU 2009, pp. 552-557.

Norman Makoto Su, et al., "Virtual Spectating: Hearing Beyond the Video Arcade", Proceedings of the 25th BCS conference on human-computer interaction. British Computer Society, 2011, pp. 269-278.

Thurid Vogt, et al., "Automatic Recognition of Emotions from Speech: A Review of the Literature and Recommendations for Practical Realisation", Affect and emotion in HCI, LNCS 4868, Springer Berlin Heidelberg, 2008, pp. 75-91.

(56) References Cited

OTHER PUBLICATIONS

Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.

Amazon Web Services, "Amazon AppStream Developer Guide", 2014, pp. 1-195.

"Generations of Game Analytics, Achievements and High Scores", Ben Medler, Eludamos Journal for Computer Game Culture vol. 3, No. 2, 2009, pp. 177-194.

U.S. Appl. No. 14/318,083, filed Jun. 27, 2014, Michael Martin George.

U.S. Appl. No. 14/318,117, filed Jun. 27, 2014, Michael Martin George.

* cited by examiner

```
<initial game state>
<timestamp><current game state>
<timestamp><current game state>
<timestamp><current game state>
<timestamp><current game state>
<timestamp><current game state>
<timestamp><current game state>  (event A)
...
<timestamp><current game state>  (event B)
...
<timestamp><current game state>  (event C)
...
<timestamp><current game state>  (event D)
...
<timestamp><current game state>  (event E)
...
<end game state>
```

FIG. 7A

```
<initial game state>
<timestamp><current game state>
<timestamp><current game state>
<timestamp><current game state>
<timestamp><current game state>
<timestamp><current game state>
<timestamp><current game state>  (event A)
...
<timestamp><current game state>  (event B)
...
<timestamp><current game state>  (spawn event)
...
<timestamp><current game state>  (event C')
...
<timestamp><current game state>  (event F)
...
<timestamp><current game state>  (event G)
...
<timestamp><current game state>  (event H)
...
<end game state>
```

FIG. 7B

```
<player/character>
    <attributes>
        <fight or flight><value>
        <weapon preference>
        <reaction time><value>
        <accuracy><value>
        <shooting style>
        ...
...
```

FIG. 8A

```
<player>
    <global attributes>
        <reaction time><value>
        ...
    <game/game type A attributes>
        <fight or flight><value>
        <weapon preference>
        <accuracy><value>
        <shooting style>
        ...
    <game/game type B attributes>
        <attribute B1><value>
        <attribute B2><value>
        ...
    ...
...
```

FIG. 8B

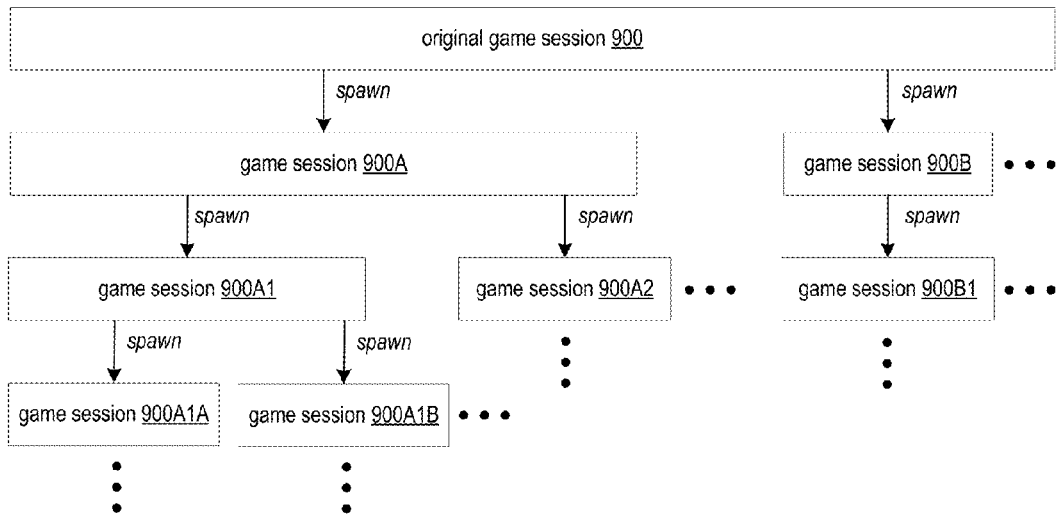

FIG. 9A

```
<original game session 900>
    <game session 900A>
        <game session 900A1>
            <game session 900A1A>
            <game session 900A1B>
            ...
        <game session 900A2>
        ...
    <game session 900B>
        <game session 900B1>
        ...
    ...
<original game session 901>
    <game session 901A>
    ...
<original game session 902>
...
```

FIG. 9B

```
player 150A
    <original game session 900>
    <game session 900A1B>
    <game session 900A2>
    <game session 900B>
    <game session 901A>
    ...
player 150B
    <game session 900A>
    <game session 900A1A>
    <original game session 901>
    ...
player 150C
    <game session 900A1>
    <game session 900B1>
    <original game session 902>
    ...
```

FIG. 9C

```
<session tag>
<owner/spawned by [player]>
<description>
<date/time>
<play time>
<players in session [player list]>
<session results>
<session statistics>
<spawned from session [session tag]>
<spawned at [game universe timeline point]>
<spawned sessions [session tag(s)]>
...
```

SPAWNING NEW TIMELINES DURING GAME SESSION REPLAY

BACKGROUND

Computer-based games have evolved from single-player game programs installed and executed on personal computers to include technologies that allow multiplayer gaming in which two or more players may simultaneously participate in a game session. For example, game consoles may host console-based multiplayer games that allow multiple players to simultaneously participate in a game session via separate controllers connected to the console. As another example, network-based multiplayer games, which may be referred to as online games, may allow multiple players to simultaneously participate in a game from consumer devices coupled to a network. Evolution of the Internet, Web-based computing, and mobile computing, including the increasingly widespread availability of broadband connections and the availability and capabilities of consumer computing devices including but not limited to mobile computing devices such as pad/tablet devices and smartphones, has led to continuing evolution and growth of multiplayer online gaming. Multiplayer games may include everything from relatively simple, two-dimensional (2D) casual games to more complex 2D or three-dimensional (3D) action or strategy games that may involve two or more players in a game session, to world-building multiplayer games, to complex 3D massively multiplayer online games (MMOGs) such as massively multiplayer online role-playing games (MMORPGs) that may simultaneously support hundreds or thousands of players in a persistent online "world".

BRIEF DESCRIPTION OF THE DRAWINGS

FIG. 7A shows game session metadata from an example original game record corresponding to the example timeline of FIG. 6A, according to at least some embodiments.

FIG. 7B shows game session metadata from an example new game record corresponding to the new timeline of FIG. 6B, according to at least some embodiments.

FIG. 8A shows an example player profile, according to at least some embodiments.

FIG. 8B shows another example player profile, according to at least some embodiments.

FIG. 9A graphically illustrates an example game session tree, according to at least some embodiments.

FIGS. 9B and 9C illustrate example listings of game sessions, according to at least some embodiments.

Figure 1A:
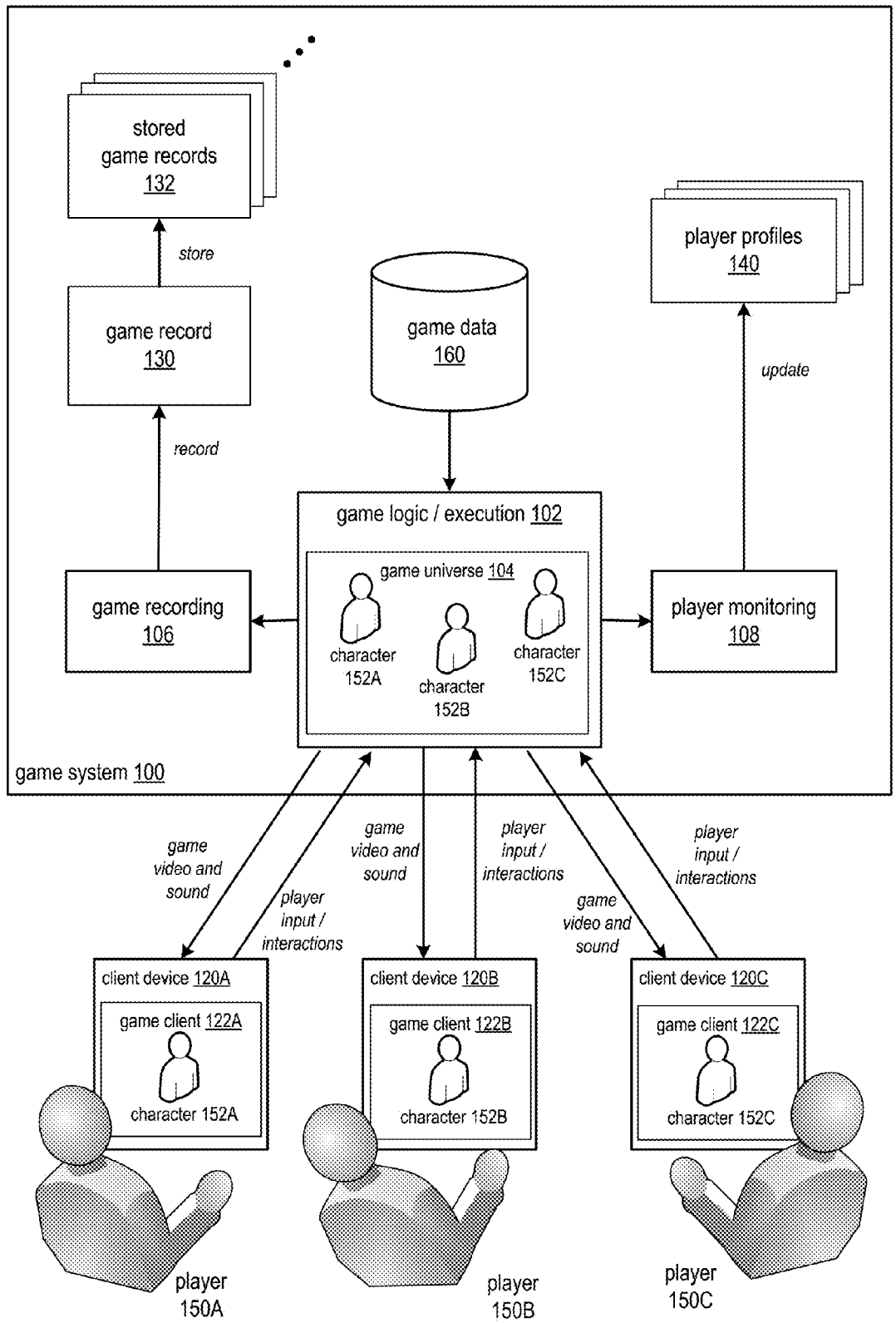
FIG. 1A illustrates recording a game record and updating profiles of players during a game session in a multiplayer game system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for replaying game sessions in computer-based games, including but not limited to multiplayer games, are described. Conventional multiplayer computer games may allow players to view static replays of recorded game sessions, or to restart a game from a given point (e.g., from the beginning of a level in a multi-level game). Embodiments of game methods and apparatus are described that allow players to store continuous records of the states of previously played game sessions in a game, for example in a multiplayer game. Each stored game session may be viewed as a separate game universe or timeline involving the game characters of the players that participated. A player may then access the stored state information for a previously played game session to watch a replay of the game. However, unlike conventional game systems in which the replay is static and can only be viewed, a player can "step into" the player's game character at any point in the game and begin controlling the character. Upon the player taking over the player's game character and interacting with the game, a new game universe and timeline is spawned from the original game session. As the game session progresses on the new timeline, the new universe diverges from the universe of the original game session. Anywhere from slightly to drastically different outcomes of a game session may be achieved from even minor differences in game play on the new timeline. This new universe/timeline can be recorded and saved, replayed, and new universe/timelines may be spawned off of it. Similarly, the original universe/timeline can be persisted, can again be replayed, and other different universe/timelines can be spawned from it.

In at least some embodiments, various actions of a player when controlling the player's character in game sessions may be monitored and used to create (and update over time) a profile for the player's character that reflects or models the actual game play of the player when participating in the game as the character. In at least some embodiments, the game may include logic (e.g., an artificial intelligence (AI) engine) that can simulate game play of a given player by controlling the actions of the player's character according to the player's profile. When a player steps into a previously recorded game session, the actions of one or more other characters in the game may from that point forward at least initially be controlled by the game logic based on the characters' profiles. As the game deviates from the original universe/timeline, the simulated characters respond to events according to the corresponding players' live playing characteristics as recorded in the profiles. However, in at least some embodiments, another player can step into and take control of their respective character at any point during the game play.

In at least some embodiments, when a player replays a previously recorded game session or when a player steps into a previously recorded game session that is being replayed, one or more other players that were involved in the original game session may be notified that the game session involving their characters is being replayed, and may be invited to participate in the session. An invitation to participate may, for example, be initiated by the player who initiated the replay using one or more communications channels such as social media, text messaging, email, telephone, etc. In some embodiments, the game user interface may include a "notify other players" interface element that allows a player to optionally invite one or more of the other players to participate in the game replay. In some embodiments, the game system may automatically generate and send a notification to one or more of the other players via one or more communications channels (e.g., text messaging, alert messaging, email, etc.) when a replay of a stored game session is initiated by another player and/or when another player "steps into" their character in a previously recorded game session that is being replayed by the other player.

Embodiments may be used to record original game sessions in which multiple players control their game characters; the original game sessions may then be replayed, with one or more of the players stepping into and taking control of their characters at any point of the game session to generate a new universe/timeline for the game session from that point onward. In at least some embodiments, the game sessions are recorded according to the viewpoint of each player/character in the game so that the different perspectives of the players/characters in the game sessions can be viewed when the game sessions are played back. Once a new universe/timeline is spawned, one or more of the characters that are not being controlled by their corresponding players may instead be controlled by the game logic (e.g., via a player simulation or artificial intelligence (AI) component of the game system) according to the corresponding players' profiles.

In at least some embodiments, when a game session is being replayed from a game record, one or more of the players that participated in the game session may choose to watch the replay of the game session via respective client devices without actively participating in or controlling characters in the game session. Watching or viewing a replay without actively participating may be referred to as participating in "ghost" mode, or as ghosting. In at least some embodiments, the game system may play back the game session from one, two or more viewpoints or perspectives of the characters involved in the game which can be viewed in ghost mode. For example, a first player may view the replay from a perspective corresponding to the viewpoint of the first player's character, while a second player may view the replay from a different perspective corresponding to the viewpoint of the second player's character. In at least some embodiments, a player may be allowed to view the replay in ghost mode from the perspective of characters that are not associated with the player. In at least some embodiments, a player may select to view the replay from either a first person viewpoint (i.e., through the eyes) or third person viewpoint (e.g., above or behind the head) of a given character. Note that, once a player steps into and takes control of a character in the game session, the player is no longer viewing the game session in ghost mode. However, one or more other players may choose to continue viewing the game in ghost mode without actively participating, or one or more other players may join the replay to view the game in ghost mode without actively participating.

In at least some embodiments, a player may be allowed to "step out" of the player's game character that the player is actively controlling during game play. In at least some embodiments, the game logic (e.g., an AI component of the game system) may take over control of a player's game character if the player chooses to step out of the character during a game session.

In some embodiments, an original game session may be initiated in which one or more, or even all, of the characters participating in the game session are at least initially controlled by the game logic (e.g., by an AI component of the game system) according to the corresponding players' profiles. During the game session, one or more of the players with a character in the game may step into and take over control of their game characters.

In at least some embodiments, a player (for example, a skilled or known player for a particular online game) can record game sessions involving the player's game character and offer the recorded game sessions to others for replay and possible participation as other characters in the game playing against the original player's computer-controlled character. If a player steps into a game session so obtained by taking control of a character, a new universe/timeline may be spawned in which the player participates with the other player's character as controlled by the game logic according to the other player's profile provided with the recorded game session. These recorded game sessions may, for example, be offered online in exchange for virtual or real currency, or for free.

While embodiments are primarily described herein in the context of replaying game sessions in multiplayer game environments in which two or more players participate in a game session to generate game records which can then be replayed, it is to be noted that embodiments may also be applied in single-player game environments, as well as in multiplayer game environments, in which a single player plays in and generates a game record for the game session.

Figure 17:
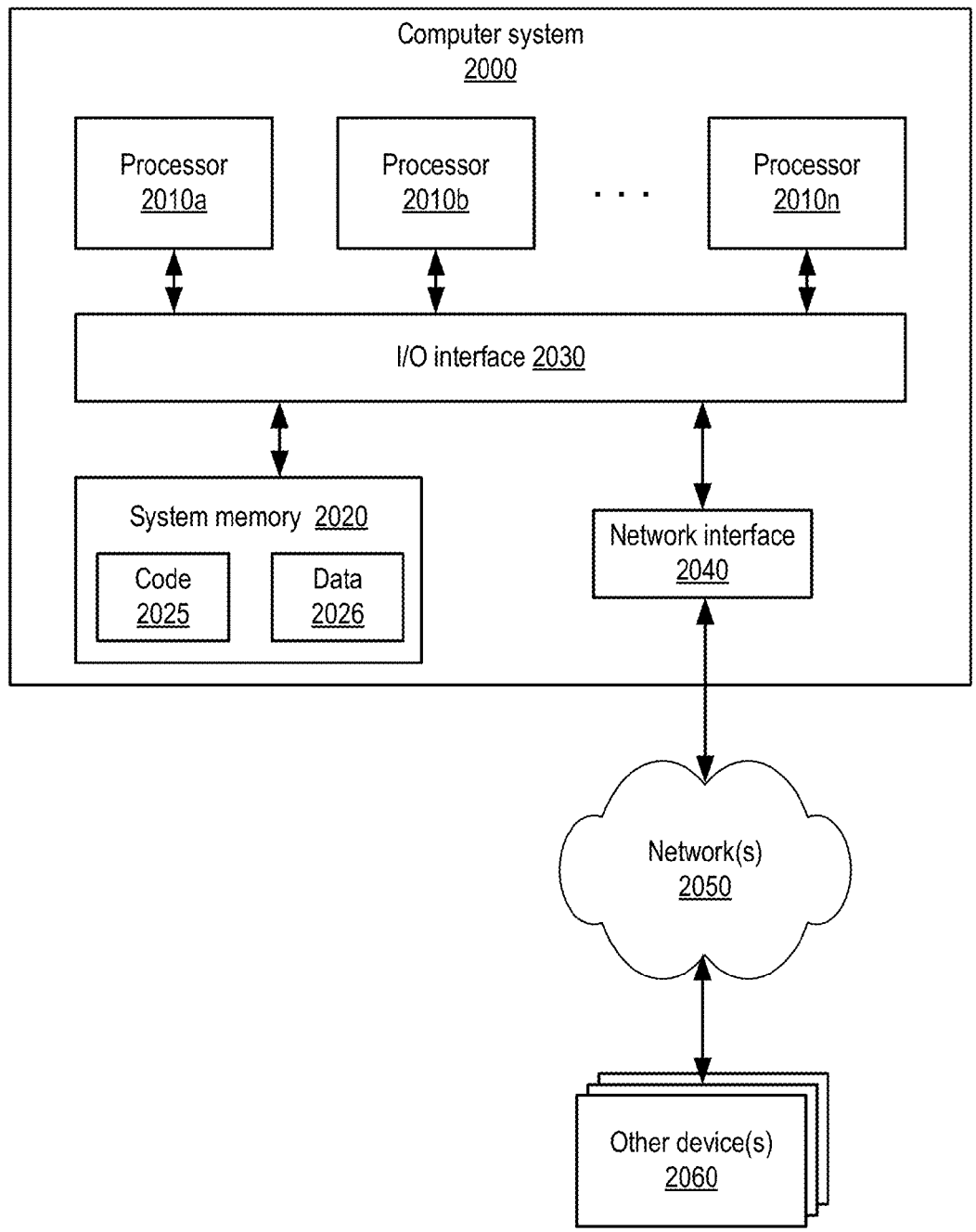
FIG. 17 is a block diagram illustrating an example computer system that may be used in some embodiments.

FIGS. 1A through 1D are block diagrams that graphically illustrate methods and apparatus for replaying game sessions of a multiplayer game in an example computer-based multiplayer game environment, according to at least some embodiments. In at least some embodiments, a multiplayer game environment may include a multiplayer game system 100 and one or more client devices 120. The multiplayer game system 100 stores game data and information, implements multiplayer game logic, and serves as an execution environment for the multiplayer game. In at least some embodiments, multiplayer game system 100 may include one or more computing devices, for example one or more server devices, that implement the multiplayer game logic, and may also include other devices including but not limited to storage devices that store game data 160. However, in some embodiments, the functionality and components of game system 100 may be implemented at least in part on one or more of the client devices 120. Game data 160 may, for example, store persistent and global data for constructing and rendering the game environment/universe, such as graphical objects, patterns, and so on. Game data 160 may also store player information for particular players 150 including but not limited to the player's registration information with the game system 100, game character 152 information, client device 120 information, personal information (e.g., name, account number, contact information, etc.), security information, and preferences (e.g., notification preferences). In at least some embodiments, game data 160 may also store group information for games in which players may form or join game playing groups, which may be referred to as gaming groups. Game data 160 may also include other game-related information such as game records 130 that each store data from a previously played game session, and player profiles 140 that each model a particular player's game play either as a particular game character or as two or more game characters. An example computing device that may be used in a multiplayer game system 100 is illustrated in FIG. 17.

A client device 120 may be any of a variety of consumer devices including but not limited to desktop computer systems, laptop/notebook computer systems, pad/tablet devices, smartphone devices, game consoles, handheld gaming devices, and wearable gaming devices. Wearable gaming devices may include, but are not limited to, gaming glasses or goggles and gaming "watches" or the like that are wearable on the wrist, arm, or elsewhere. Thus, client devices 120 may range from powerful desktop computers configured as gaming systems down to "thin" mobile devices such as smartphones, pad/tablet devices, and wearable devices. Each client device 120 may implement an operating system (OS) platform that is compatible with the device 120. A client device 120 may include, but is not limited to, input and output components and client software (game client 122) for the multiplayer game via which respective players 150 can participate in a multiplayer game session currently being executed by the multiplayer game system 100. The game client 122 on a particular client device 120 may be tailored to support the configuration and capabilities of the particular device 120 type and the OS platform of the device 120. An example computing device that may be used as a client device 120 is illustrated in FIG. 17.

Figure 12:
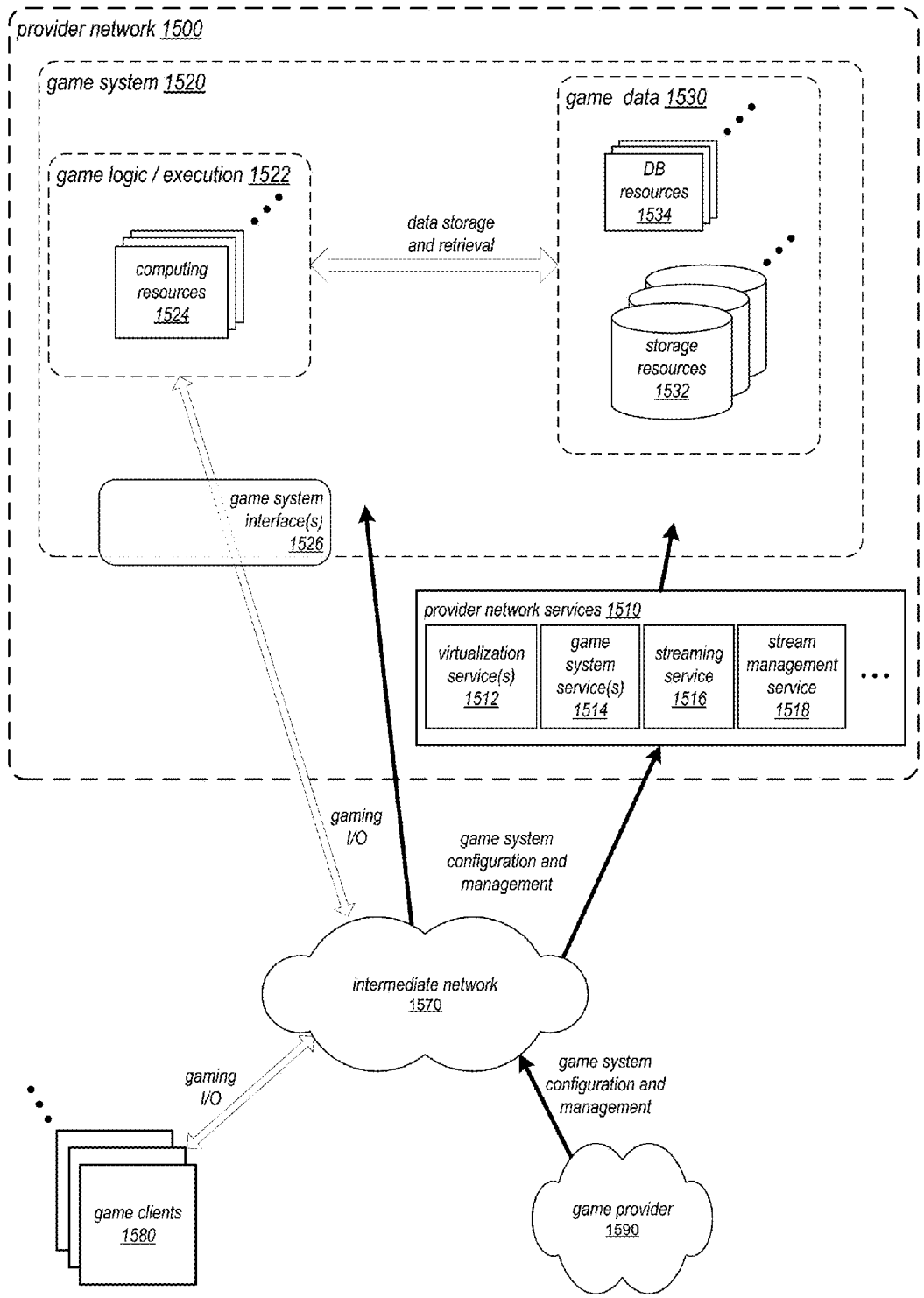
FIG. 12 illustrates an example network-based gaming environment, according to at least some embodiments.

In at least some embodiments, the multiplayer game system 100 may implement an online multiplayer game, and the multiplayer game system 100 may be or may include one or more devices on a network of a game provider that implement the online multiplayer game logic and that serve as or provide an execution environment for the online multiplayer game. In these online multiplayer game environments, game clients 120 are typically remotely located from the multiplayer game system 100 and access the game system 100 via wired and/or wireless connections over an intermediate network or networks such as the Internet. Further, client devices 120 may typically each have both input and output capabilities for playing the online multiplayer game. FIG. 12 illustrates an example network-based multiplayer gaming environment that includes a game system hosted on a provider network that may serve as an execution environment for a multiplayer online game.

However, in some embodiments, a multiplayer game system 100 may at least in part be implemented as or on one or more devices that locally implement game logic and that thus locally provide at least some execution of the multiplayer game, for example a gaming console that serves as an execution environment for a console-based multiplayer game installed on the console (or executed from media inserted into the console). In these multiplayer game environments, game clients 120 are typically local to the system 100 and access the system 100 via local wired or wireless connections. Further, in these local multiplayer game environments, the device(s) that hosts the multiplayer game (e.g., a gaming console) may generally include or couple to a display device such as a television or monitor for displaying game graphics, and client devices 120 may typically provide only control/input capabilities for playing the multiplayer game hosted by the device (e.g., the client devices 120 may be "game controllers" coupled to a console).

Note, however, that a multiplayer game system 100 such as a gaming console may connect via wired and/or wireless connections to one or more remote network sites, services, or devices, for example to a network-based storage service for storing and retrieving game data (e.g., game records 130 that each store a previously played game session), to a server or servers of the game provider for updates, game downloads, and other information, or to one or more other instances of the multiplayer game system 100 that host the multiplayer game if the multiplayer game environment allows players 150 to participate in a game session from multiple different multiplayer game system 100 instances via a network.

Figure 16A:
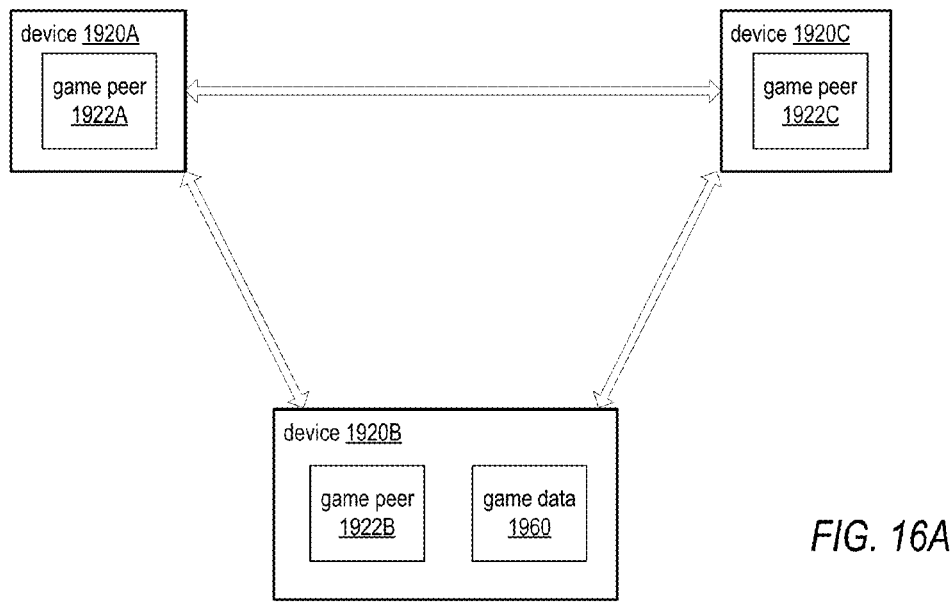
FIGS. 16A and 16B illustrate example peer-to-peer gaming environments, according to at least some embodiments.
Figure 16B:
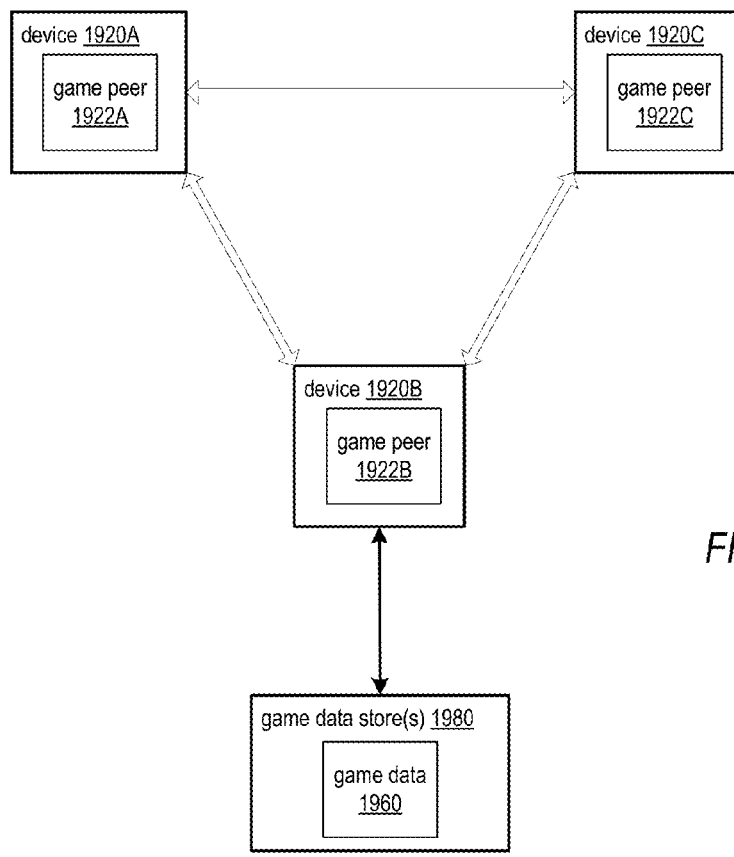

In some embodiments, instead of a game system implemented according to a client-server model or variation thereof in which one or more devices such as servers host most or all of the functionality of the game system, a game system may be implemented according to a distributed or peer-to-peer architecture, for example as shown in FIGS. 16A and 16B. For example, in a peer-to-peer game system architecture, at least some of the game functionality and components of a game system 100 as shown in FIG. 1A through 1D may be distributed among one, two, or more client devices 120 that collectively participate in a peer-to-peer relationship to execute, record, and replay game sessions.

Note that, in FIGS. 1A through 1D and elsewhere in this document, the term "player" is generally used to refer to an actual human that participates in a multiplayer game, the term "client" (as in "client device" and "game client") is generally used to refer to a hardware and/or software interface to a multiplayer game system via which a player interacts with the multiplayer game, and the term "character" or "game character" is generally used to refer to a player's in-game presence or "avatar" that the player may control via a game client on a client device to interact with other game characters, other game entities, and other objects within the game environment during a game session. Note that, in at least some embodiments, game characters may also be controlled by the game system, for example by an AI component of the game system according to respective player's profiles, during an original game session or during replay of a previously recorded game session.

Multiplayer games that may be implemented in a multiplayer game environment as described herein may vary from tightly scripted games to games that introduce varying amounts of randomness to the game play. The multiplayer game may, for example, be a game in which the players 150 (via their characters 152) attempt to achieve some goal or overcome some obstacle, and may include multiple levels that the players 150 have to overcome. The multiplayer game may, for example, be a game in which the players 150 cooperate to achieve goals or overcome obstacles, or a game in which one or more of the players 150 compete against one or more other players 150, either as teams or as individuals. Alternatively, a multiplayer game may be a game in which the players 150 may more passively explore and make discoveries within a complex game universe 104 without any particular goals in mind, or a "world-building" multiplayer game in which the players 150 may actively modify their environments within the game universe 104. The multiplayer games may include everything from relatively simple, two-dimensional (2D) casual games to more complex 2D or three-dimensional (3D) action or strategy games, to complex 3D massively multiplayer online games (MMOGs) such as massively multiplayer online role-playing games (MMORPGs) that may simultaneously support hundreds or thousands of players in a persistent online "world".

Recording Game Sessions

Figure 2:
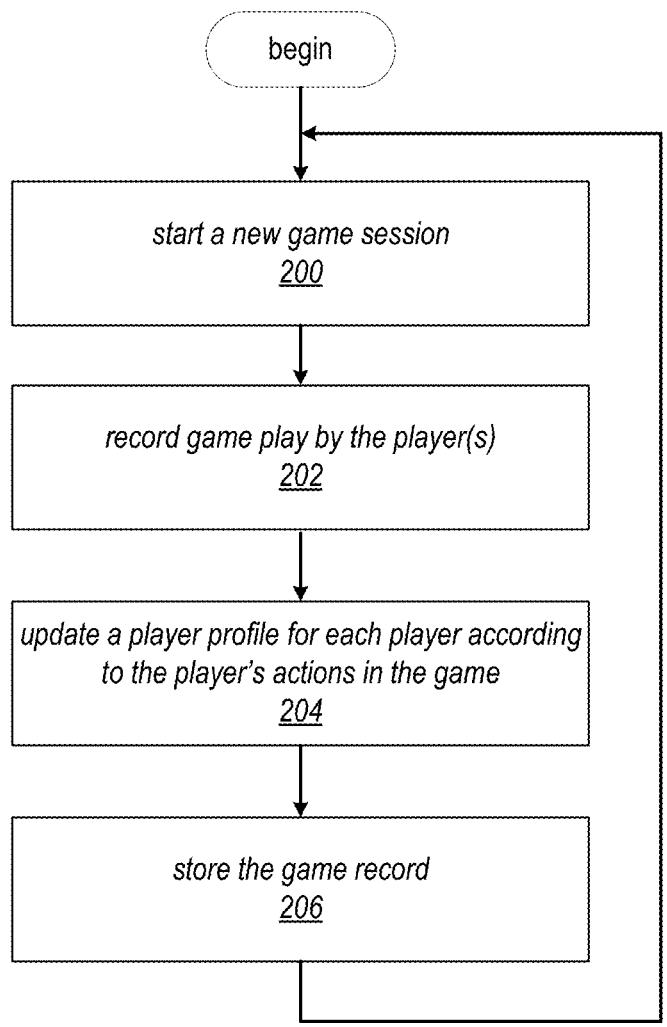
FIG. 2 is a high-level flowchart of a method for recording game records and updating profiles of players during a game session in a multiplayer game system, according to at least some embodiments.
Figure 6A:
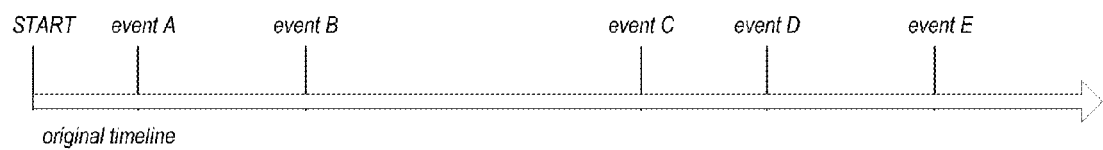
FIG. 6A provides a graphical representation of an example game session timeline, according to at least some embodiments.

FIG. 2 is a high-level flowchart of a method for recording game records and updating profiles of players during a game session in a multiplayer game system, according to at least some embodiments. As indicated at 200, a new game session may be initiated by one or more players. For a particular game session, the game system may generate a game universe that includes the game session's context, characters, and environment. In at least some embodiments, each player that participates in the game session may assume a character in the game, and may control the character in the game universe using a game client instance on a client device. As indicated at 202, the game play of the players during the game session may be recorded to a game record. Note that a game record may represent a particular timeline with a particular sequence of events that occurred in the game universe during the recorded game session. In at least some embodiments, the game system may record a view of the game universe from the perspective of each player's character to the game record. FIG. 6A shows an example original timeline for a game session, and FIG. 7A shows game session metadata from an example game record according to at least some embodiments. As indicated at 204, in at least some embodiments, during game play, the game system may also update a player profile for each player according to the player's actions in the game session. As indicated at 206, the game record may be stored once the player(s) have completed play in the game session. FIG. 7A shows game session metadata from an example game record according to at least some embodiments. The elements of FIG. 2 are explained in more detail in reference to FIG. 1A.

FIG. 1A illustrates recording a game record and updating profiles of players during a game session in a multiplayer game system, according to at least some embodiments. One or more players 150 may interact with game system 100 via respective client devices 120 to initiate a game session and to control the players' respective characters 152 in the game as it progresses. FIG. 1A shows, as a non-limiting example, three players 150A-15C that control their respective characters 152A-152C via the game clients 122A-122C on respective client devices 120A-120C. In at least some embodiments, game system 100 may store player information for each player 150 including but not limited to the player's game character 152 information and security information for the player 150. The security information for a player 150 may include information (as a simple and non-limiting example, a password) that can be used to authenticate a player 150 and to authorize the player's access to the game system and to the player's resources in the game system 100 such as the player's game character(s) 152 and gaming group(s) to which the player 150 may belong. The security information may, for example, be used to prevent one player 150 from controlling a character 152 of another player 150 without the other player's permission.

For a particular game session, game logic/execution 102 of the game system 100 may generate a game universe 104 that includes the game session's context, characters, and environment. The players 150 manipulate their characters 152 within this universe 104 via the client devices 120. The game system 100 may generate and display a view of the game universe 104 from the perspective of each player's character 152 to the player 150 via the game client 122 on the player's respective client device 120, and may receive player input to and interactions with the game universe 104 via the player's manipulation of each player's respective character 152 via the game client 122 on the player's respective client device 120.

The following is a broad description of an example method for game execution, and is not intended to be limiting. Typically, game logic/execution 102 of the game system 100 is implemented according to event-driven architecture in which a game event loop monitors for and reacts to players' inputs to and interactions with the game universe 104 via their characters 152 as controlled by client devices 120. Based upon the players' inputs and interactions with the universe 104 and on other game factors (e.g., scripted events and/or a randomness component) at iterations of the game event loop, the game session progresses along a game session timeline, with the game universe 104 being modified and updated accordingly. A graphical representation of an example game session timeline is provided in FIG. 6A.

Figure 13:
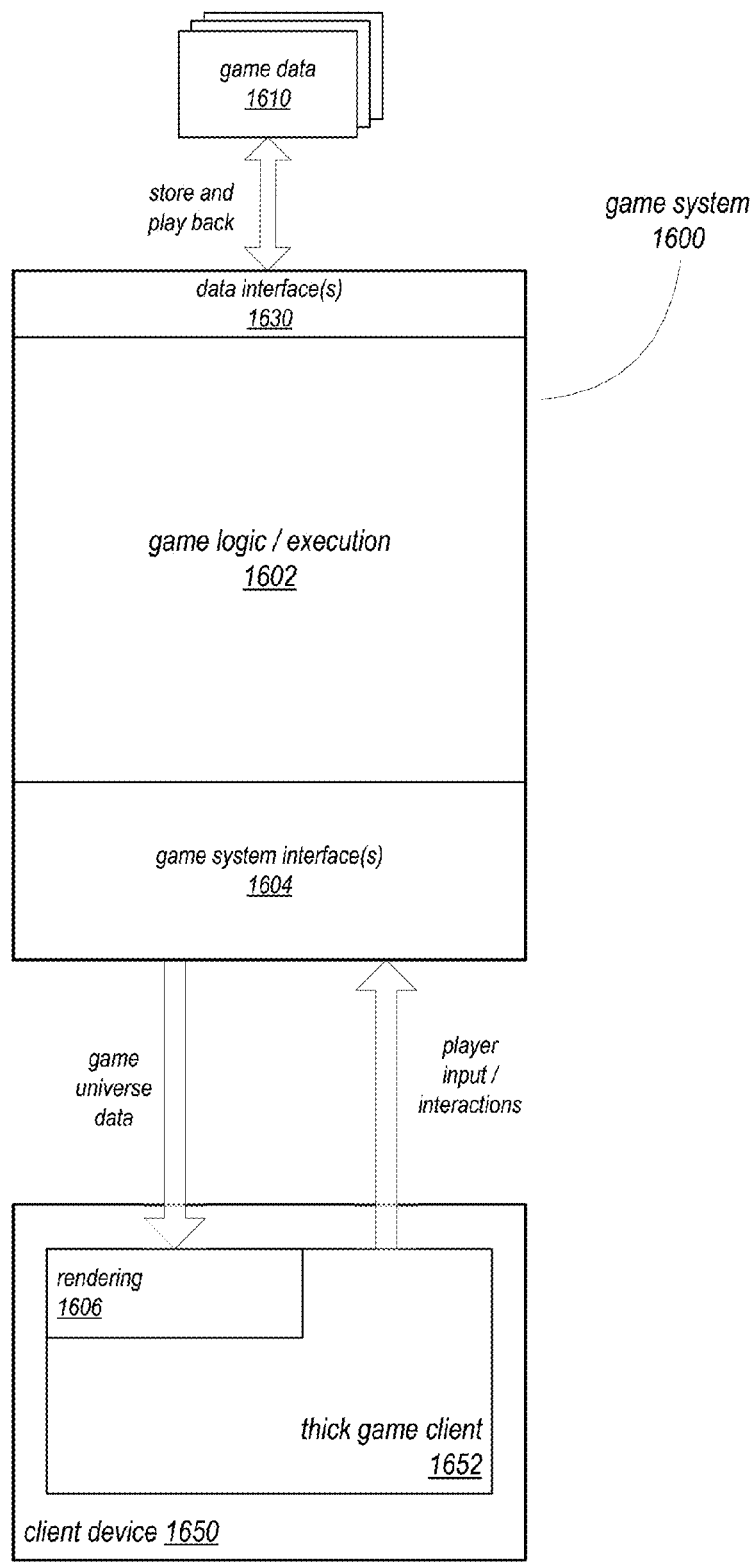
FIG. 13 illustrates an example network-based gaming environment that uses thick game clients, according to at least some embodiments.
Figure 14:
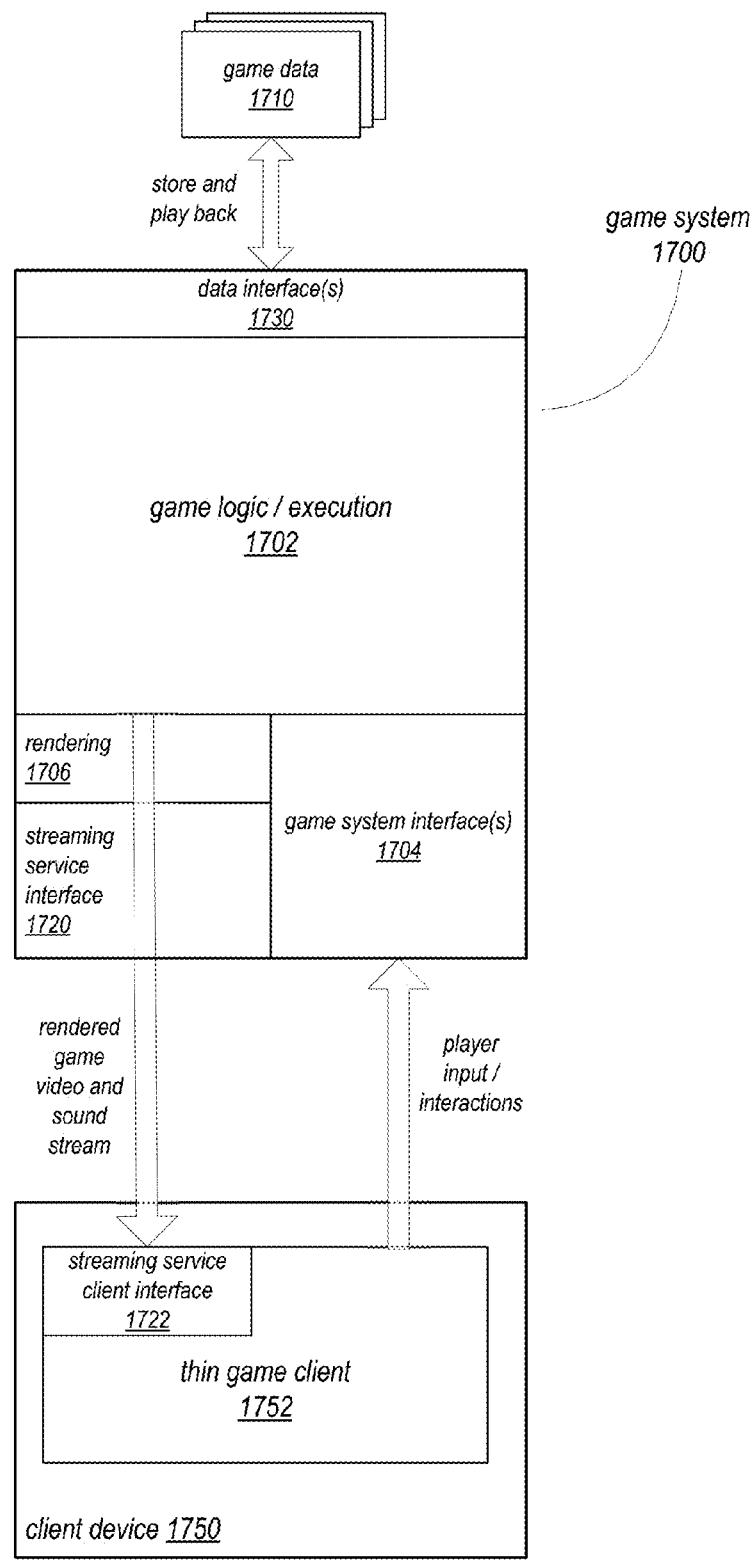
FIG. 14 illustrates an example network-based gaming environment in which a streaming service is used to provide rendered game video and sound to thin game clients, according to at least some embodiments.

In some embodiments, concurrent with the game event loop execution, game system 100 renders a 2D or 3D representation of the universe 104 based on the current state of the universe 104, generates video and sound according to a video frame rate based upon the rendering, and sends or streams the video and sound output to the client devices 120 for display. Note that video and sound may be generated for and sent or streamed to each client device 120 according to a corresponding character 152's current perspective or view of the universe 104. These game clients may be referred to as "thin" game clients as the game clients may not implement a 2D or 3D rendering component. FIG. 14 illustrates an example network-based gaming environment in which rendered game video and sound is streamed to thin game clients on client devices. However, in some embodiments, at least a portion of the actual rendering may be performed by "thick" game clients 122 on the client devices 120 that do implement a 2D or 3D rendering component. In these implementations, instead of the game system 100 performing the full rendering of the game universe 104 into video and sound and sending the video and sound to "thin" game clients on client devices 120 for display as shown in FIG. 14, the game system 100 may instead send universe 104 data to the client devices 120 from which thick game clients 122 can render and display video and sound. FIG. 13 illustrates an example network-based gaming environment that uses thick game clients on client devices.

Figures 10, 11:
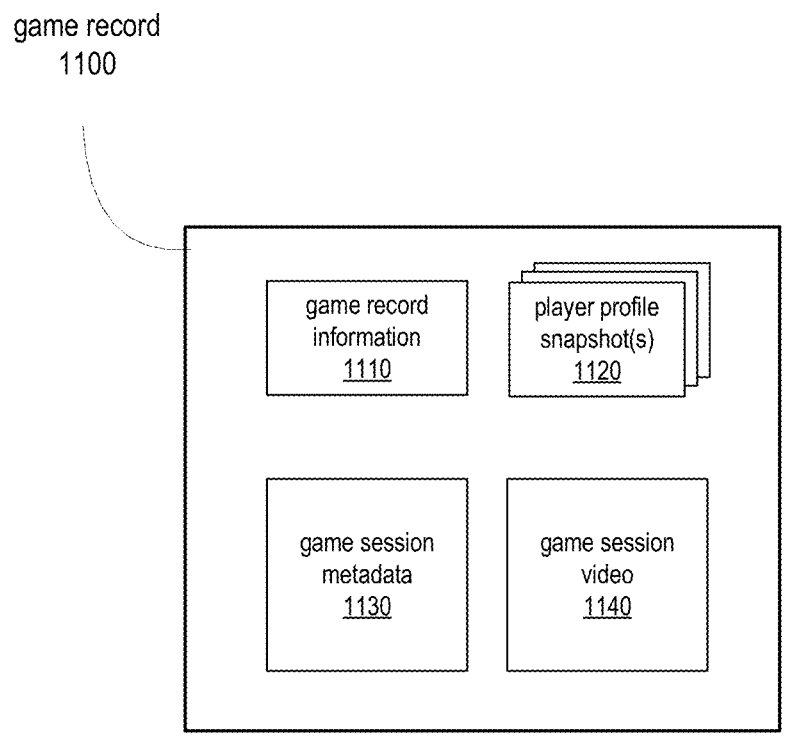
FIG. 10 shows an example of additional information (metadata) about a previously played game session as recorded in a game record, according to at least some embodiments.
FIG. 11 shows an example game record, according to at least some embodiments.

The game system 100 may include a game recording 106 component. During a game session, game recording 106 may record game information to a game record 130 for the session. FIG. 11 shows an example game record, according to at least some embodiments. FIG. 7A shows game session metadata from an example game record corresponding to the example timeline of FIG. 6A. The game information that is recorded as game session metadata may include an initial game state from which the game universe 104 is initialized and from which the game timeline is launched. Game recording 106 may also periodically or aperiodically record entries in game record 130 each indicating a current game state at a specified time as the game session progresses. In at least some embodiments, game recording 106 may record metadata corresponding to the perspective of two or more player's characters 152 involved in the game session in the game record 130. In some embodiments, game recording 106 may record game session video in the game record 130 instead of or in addition to game session metadata. In some embodiments, game recording 106 may record two or more different video streams each corresponding to the perspective of a different player's character 152 involved in the game session in the game record 130. In some embodiments, game recording 106 may also store snapshots of the players' profiles 140 to the game record 130 during or at the end of the game session. In some embodiments, game recording 106 may also store game record information that includes information about the respective game session, for example game record information as illustrated in FIG. 10, to the game record 130.

Once a game session is complete, the completed game record 130 may be stored to a collection of stored game records 132. In at least some embodiments, the players 150A-150C may be members of a gaming group for the multiplayer game system 100, or may form or join a gaming group, and the record 130 for the game session may be stored to a collection that is specific to that gaming group. In at least some embodiments, game clients 122 may provide an interface via which player(s) 150 may, for example, choose to store a game record 130, choose a location to store a game record 130, name a game record, 130, and otherwise view and manage game records stored in a collection or collections.

In at least some embodiments, the frequency of recording the current game state of a game session to a game record may depend on the type of game and the actual game implementation. Further, in some implementations, entries may only be recorded in response to detecting a change in the game universe 104. However, note that the entries may generally be recorded at a rate that is at least sufficient to recreate the game universe 104 and to replay the game session from the game record. Further, the amount and type of information recorded as the current game states in the entries of a game record may also depend on the type of game and the actual game implementation. For example, a tightly scripted multiplayer game in which the players 150 follow a scripted path through the universe 104 many not require as much state information to be recorded as would a multiplayer game that includes a significant amount of randomness and/or that allows players 150 more freedom to explore the universe 104. However, each entry may generally contain game state information that is sufficient to advance the game session and the game universe 104 during replay from its previous state on the game timeline to the current state on the game timeline.

The game system 100 may also include a player monitoring 108 component that may monitor various actions of the players 150 when controlling their respective characters 152 in the game universe 104 from the client devices 120. The monitored actions of the players 150 may be used to create, and update over time, player profiles 140 for the respective players 150 that model the players' game play. FIGS. 8A and 8B illustrate examples of player profiles 140, according to at least some embodiments. The examples given in FIGS. 8A and 8B are not intended to be limiting. In at least some embodiments, each player profile 140 may store values for one or more game play attributes of the respective player 150 as determined from the actions of the player 150 when participating in the game. In at least some embodiments, the values for at least some the attributes that are stored in the profile 140 may be determined according to various statistical techniques. As just one example, the player monitoring 108 component may monitor reaction time of a player 150 to particular events in the game, and may maintain a value representing a running average of the player's reaction time in the player's profile 140.

The types of actions that are monitored, and the types and numbers of game play attributes that are derived from the monitored actions, may depend upon the type of game. For example, FIG. 8A shows example player attributes for a fighting game or "first person shooter" game according to some embodiments. In this example, a player's attributes that are tracked for a fighting game may include one or more of, but are not limited to, tendency to fight or flee, weapon preference, reaction time, accuracy, and shooting style (e.g., selective or spray). Note that the attributes that are tracked may be relatively few and at a relatively high level as shown in FIG. 8A, or may be more detailed. For example, one or more of a player's tendency to fight or flee, weapon preference, reaction time, accuracy, and shooting style may be separately tracked for different situations or scenarios in the game. Also note that, in games that allow a player 150 to establish multiple characters 152 in a game system 100, a player's game play attributes using two or more characters 152 may be tracked and stored collectively in a player profile 150, or alternatively game play attributes for the player 150 may be tracked and stored separately for each of the player's characters 152 in the game.

In at least some embodiments, a player 150's game play attributes may be tracked across two or more different games, or even across different types of games, and used to build a common player profile 140 for the player 150. FIG. 8B shows an example player profile 140 that includes game play attributes for two or more different games and/or types of games. As shown, one or more attributes (e.g., reaction time) may be global attributes that are common to most if not all games or game types and that are tracked across two or more different games and collectively used to generate and refine the values for the global attributes the player's profile 140. Other attributes may be game or game type specific. In this example, example game play attributes for a fighting game/ game type A are shown, as well as example game play attributes (B1, B2 . . . ) for a game/game type B. Game/game type B may, for example, be a driving or racing game or game type, and the attributes (B1, B2 . . . ) may be driving attributes/ preferences.

Figure 3:
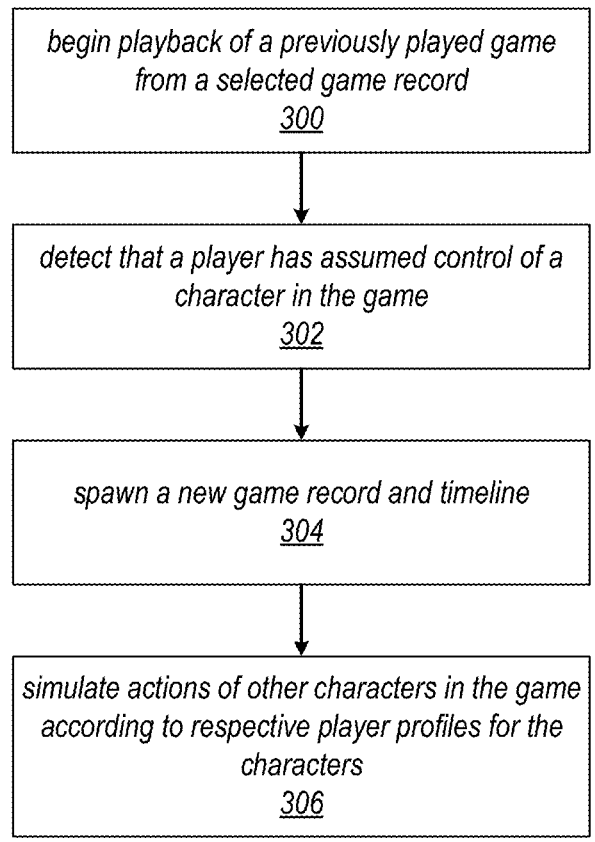
FIG. 3 is a high-level flowchart of a method for playing back a previously recorded game record and for a player assuming control of a character during the playback, according to at least some embodiments.

Playing Back Game Sessions and Spawning New Timelines During Game Session Replay FIG. 3 is a high-level flowchart of a method for playing back a previously recorded game record and for a player assuming control of a character during the playback, according to at least some embodiments. A player may select a game record to be replayed, for example from a collection of game records that belong to a particular gaming group that the player is a member of Note that a game record may represent a particular timeline with a particular sequence of events that occurred in the game universe during the recorded game session. As indicated at 300, the player may begin playback of the previously played game session from the selected game record. In some embodiments, the game system may regenerate the game universe that includes the game session's context, characters, and environment from the information stored in the selected game record, and may begin playing back the game session as recorded (e.g., generating and rendering the state of the game universe as it progresses along the timeline indicated by the game record.)

Figure 6B:
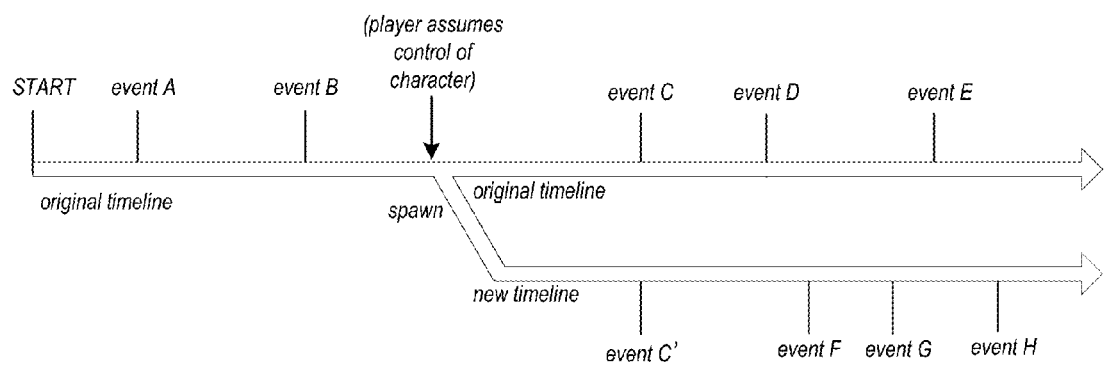
FIG. 6B provides a graphical representation of spawning a new timeline from an original game session timeline in response to a player stepping into a character in a replay of the game session, according to at least some embodiments.

The player may view the playback of the game session, for example via the player's game client on a client device, as if the player is watching a video of the game session. In some embodiments, the game system may display the replay of the game session from the perspective of the player's character on the client device. However, the game system may allow the player to step into and take control of the player's character at any time during the playback, thus spawning a new timeline in the game universe. As indicated at 302, the game system may detect that the player has assumed control of the player's character in the game session being played back. As indicated at 304, in response, the game system spawns a new game record and new timeline from the selected game record and original timeline, begins game execution for the new game session, and begins recording new game states to the new game record. (Note that the new game record may be the same as the original game record up until the time of the spawn event). FIG. 6B shows an example of spawning a new timeline for a game session from an original timeline, and FIG. 7B shows game session metadata from an example new game record spawned from an original game record as shown in FIG. 7A according to at least some embodiments.

As indicated at 306, in at least some embodiments, once a player steps into a game session being replayed, the game system may begin simulating actions of one or more other characters involved in the game session according to the player profiles corresponding to the characters. In at least some embodiments, upon detecting that the player has assumed control of the character in the game session being played back from the game record as indicated at 302, the actions of one or more other characters in the original game session at the time of the spawn event may from that point forward at least initially be controlled by logic (e.g., artificial intelligence (AI) logic) of the game system according to the players' attributes as recorded in the player profiles corresponding to the characters.

In at least some embodiments, when a game session is being replayed from a game record, and either before or after a new timeline and new game session are spawned, one or more of the players that originally participated in the game session may choose to watch the replay of the game session via respective client devices in "ghost mode" without actively participating in or controlling characters in the game session. In at least some embodiments, the game system may regenerate different perspectives according to the characters in the game session so that each player may view the replay from the perspective of their respective character. In some embodiments, a player may be allowed to view the replay from the perspective of other characters if desired.

The above describes, at 300, that the game system regenerates the game universe from the information stored in the selected game record to play back the respective game session. However, in some embodiments, a game record may include game session video, and playing back a game session from a game record may at least initially involve playing back the video as recorded in the game record. In some embodiments, the video may include two or more different video streams each corresponding to the perspective of a different player's character involved in the game session so that the different perspectives can be presented to the respective players during playback as necessary. At 302 and 304, once a spawn event is detected and a new timeline and new game session are spawned, the game system may stop playback of the video and begin normal game execution for the new game session, with the game play of one or more characters simulated by the game system according to respective player profile(s) if necessary, as indicated at 306.

Figure 1B:
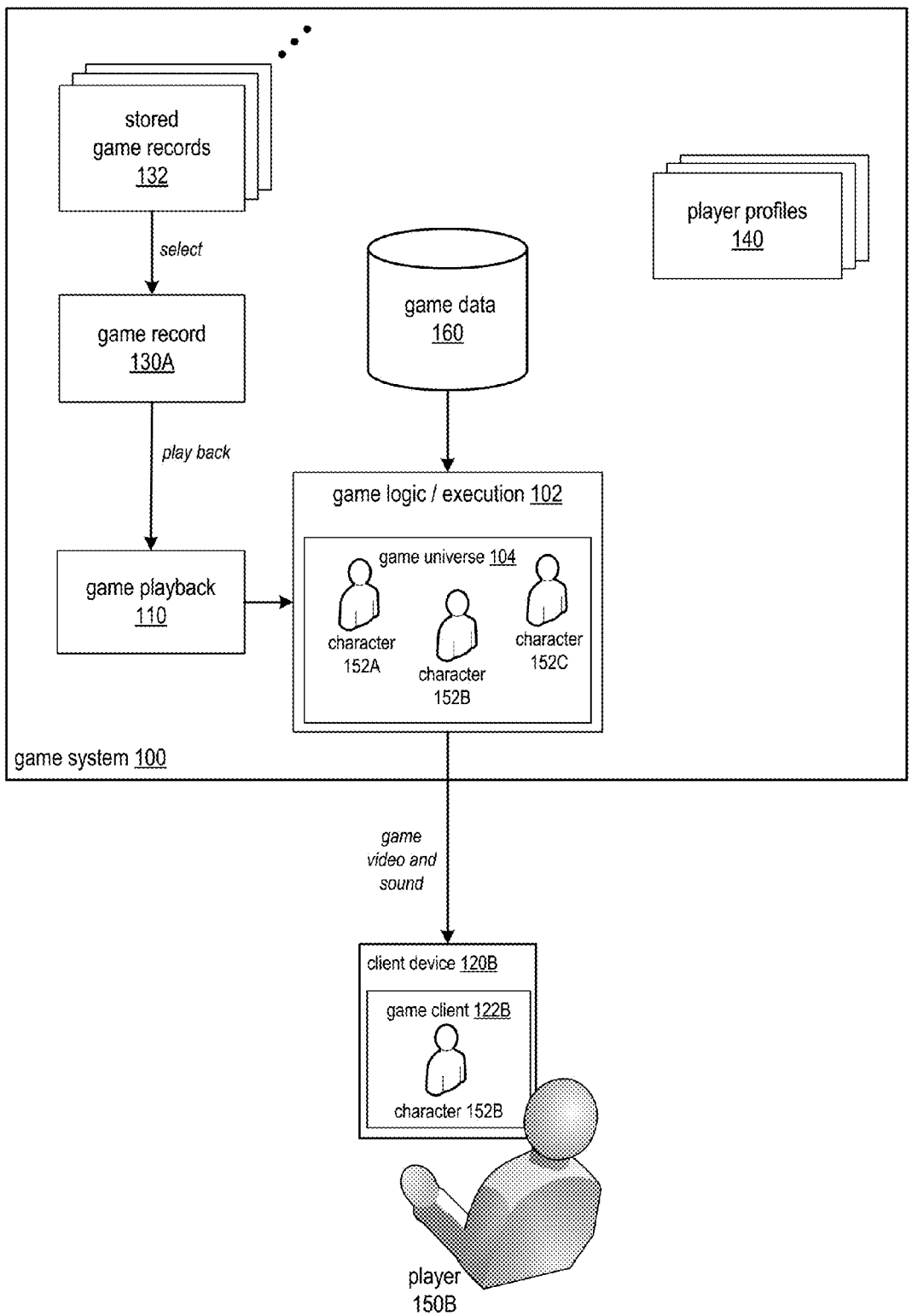
FIG. 1B illustrates a player beginning playback of a previously recorded game record, according to at least some embodiments.
Figure 1C:
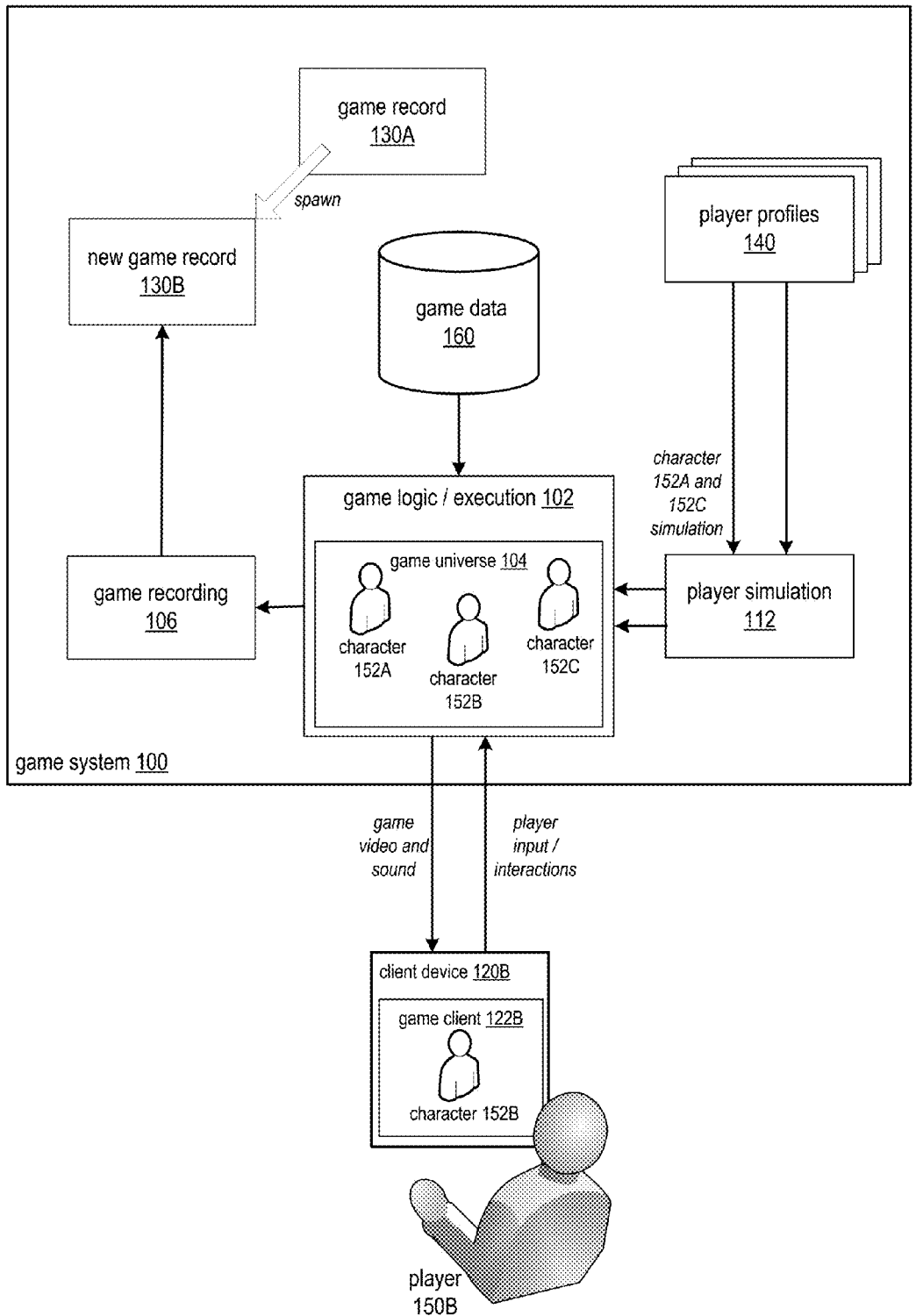
FIG. 1C illustrates a player stepping into the player's character during playback of a previously recorded game record, according to at least some embodiments.

The elements of FIG. 3 are explained in more detail in reference to FIGS. 1B and 1C.

FIG. 1B illustrates a player beginning playback of a previously recorded game record, according to at least some embodiments. Game records 130 for previously played game sessions may be stored to a collection of stored game records 132. In at least some embodiments, players may be members of gaming groups for the game system 100, and game records for game sessions played by members in a gaming group may be stored to a collection that is specific to that gaming group. In at least some embodiments, game clients 122 may provide an interface via which player(s) 150 may select game records for previously played game sessions that are stored in a collection or collections of game records 132. FIG. 1B shows that a player 150B has selected a particular game record 130A from stored game records 132 for replay via game client 122B on client device 120B.

Once a game record 130A has been selected for replay, a game playback 110 component of game system 100 may facilitate playback of the recorded game session from the game record 130A via game logic/execution 102 of the game system 100. In at least some embodiments, playback of the game session may involve regenerating the initial game universe 104 state and evolving the game universe 104 along the game timeline according to the current game states as recorded in the game record. A graphical representation of an example game session timeline is provided in FIG. 6A. FIG. 7A shows game session metadata from an example game record corresponding to the example timeline of FIG. 6A. In some embodiments, as the game session is played back from the game record 130A, game system 100 renders a 2D or 3D representation of the universe 104 based on the current state of the universe 104, generates video and sound according to a video frame rate based upon the rendering, and sends the video and sound output to the client device 120B for display. However, note that in some embodiments at least some rendering may instead be performed at the client device 120B by a thick game client 122B as previously described and as illustrated in FIG. 13.

In at least some embodiments, player 150B may choose to simply watch the replay of the game session from the selected game record 130A in "ghost mode" as if it was a static video. In at least some embodiments, the game system 100 may provide a playback control interface via game client 122B to the player 150B so that the player 150B can control playback of the game session, for example via video playback controls such as jump back, jump forward, fast playback, slow playback, and so on.

However, instead of or in addition to allowing static playback of a game session, embodiments of game system 100 and game client 122 allow the player 150B to "step into" the player's game character 152B at any point in the replay of the game session from game record 130 and to begin controlling the character 152B from client device 150B. FIG. 1C illustrates player 150B stepping into the player's character 152B during playback of a previously recorded game record 130A, according to at least some embodiments. Game system 100 may provide an interface via game client 122B that enables the player 150B to step into and take control of the actions of game character 152B during the replay of the game session if and when the player 150B desires to do so.

In at least some embodiments, upon the player 150B taking over the player's game character 152B and interacting with the universe 104 of the previously played and recorded game session at some point of the game timeline as recorded in game record 130A, a new timeline may be spawned from the original game session, and a new game record 130B may be spawned from the original game record 130A. From the point of the spawn, game recording 106 may begin recording new game state information for the new timeline to new game record 130B. FIG. 6B graphically illustrates spawning a new timeline from an original timeline, according to at least some embodiments. FIG. 7B shows game session metadata from an example new game record 130B corresponding to the example new timeline of FIG. 6B.

As can be seen by comparing FIG. 6B to FIG. 6A and comparing FIG. 7B to FIG. 7A, the new timeline and the new game record 130B may be the same as the original timeline and game record 130A up until the time of the spawn event, after which the new timeline and corresponding game record 130B diverge from the originals. For example, on the original timeline as shown in FIG. 6A and as recorded as game session metadata in the game record of FIG. 7A, events A and B occur on the original timeline prior to a point on the timeline where the player 150B resumes control of the character 152B, and events C, D, and E occur on the original timeline subsequent to the point on the timeline where the player 150B resumes control of the character 152B. On the new timeline as shown in FIG. 6B and as recorded in FIG. 7B, events A and B still occur, event C (shown as event C') still occurs but is somewhat different, events D and E that occurred on the original timeline do not occur, and events F, G, and H that were not on the original timeline do occur.

Game Records and Game Session Trees

As shown in FIGS. 1C, 6B, and 7B, a new timeline may be spawned from an original game session being replayed from a game record 130A in response to a player 150B assuming control of a character 152B in the game session, and a new game record 130B corresponding to the new timeline may be created and stored. In turn, the original game session may again be replayed from the original game record 130A, and another new timeline and game record may be spawned from it. In addition, the game session as recorded in game record 130B may be replayed, and a new timeline and game record may be spawned from it. Thus, an original game session as recorded in an original game record may be replayed multiple times, with new timelines and new game records spawned off of the original game session. In addition, the game sessions as recorded in the new game records may be replayed, with new timelines and new game records spawned off of these replays as well. Over time, a tree of game sessions may be generated from an original or root game session, potentially with one or more game sessions spawned off of the original game record at a first level of the tree, one or more game sessions spawned off of the game sessions at the second level, and so on.

At least some embodiments of a game system as described herein may provide methods for players to store, view, manage, access, and replay previously played game sessions. In at least some embodiments, each game session may correspond to a particular game record, which may be viewed as a container for data that records the corresponding game session in format(s) that allow the game session to be replayed as described herein. FIG. 11 illustrates an example game record, according to at least some embodiments. In at least some embodiments, the players may be members of a gaming group for the game system, or may form or join a gaming group, and the game records corresponding to the gaming group's game sessions may be stored to a collection that is specific to that gaming group. In at least some embodiments, the game system may provide methods for organizing, viewing, and accessing the game sessions according to game session trees as described above.

FIG. 9A graphically illustrates an example game session "family" tree, according to at least some embodiments. Note that each game session in the tree may correspond to a game record. One or more players may have participated in an original game session 900 (which may be considered the parent game session) for which a game record was generated and stored. At some point, at least one of the players may begin a replay of the original game session 900, and at some point on the original timeline that is being replayed a player may take control of a character in the game, thus spawning a new timeline and a new game record in which a new game session 900A is recorded and stored. Similarly, during a subsequent replay of original game session 900, another new game session 900B may be spawned from the original game session 900. Continuing, subsequent to game session 900A being spawned, at least one of the players may begin a replay of the game session 900A from its game record, and at some point on the timeline that is being replayed a player may take control of a character in the game, thus spawning a new timeline and a new game record in which a new game session 900A1 is recorded and stored. Similarly, during a subsequent replay of game session 900A, another new game session 900A2 may be spawned from the game session 900A. Thus, multiple child sessions may be spawned from a parent session, and additional descendant sessions may be spawned from child session(s).

In at least some embodiments, the game system may provide a user interface to the game clients via which the player(s) in a gaming group can view graphical and/or textual lists, views, or representations of the group's game session trees, or of other game session trees (e.g., game session trees of other gaming groups) to which the player(s) have appropriate access privileges. For example, in some embodiments, a graphical representation of a game session tree as illustrated in FIG. 9A may be displayed to a client device via a game client interface. FIGS. 9B and 9C illustrate some other example listings of game sessions, according to at least some embodiments. Note that the listings of FIGS. 9B and 9C may be associated with a gaming group, for example a gaming group that includes players 150A, 150B, and 150C as illustrated in FIGS. 1A through 1D, and may list some or all game sessions that have been played by the members of the gaming group. Further note that each game session shown in the listings may correspond to a particular game record.

FIG. 9B shows an example game session listing in which the game sessions are shown in a hierarchical listing corresponding to the tree structure shown in FIG. 9A. This example game session listing allows the player(s) to easily view the family tree or history of one or more different original game sessions from which multiple descendant game sessions were spawned. For example, the example game session tree from FIG. 9A is shown as <original game session 900>, with the several game sessions that have been spawned from the original game session 900 and its descendants (e.g., 900A, 900A1, . . . 900B, 900B1, . . . ) displayed in a hierarchical structure under the <original game session 900> heading. Two additional original game sessions (901 and 902) are also shown in the list, along with their descendants (if any).

FIG. 9C shows another example game session listing in which the game sessions from game session tree(s) are listed under the headings of the player(s) that generated or spawned the games sessions. This listing may be provided in addition to, or as an alternative to, the listing shown in FIG. 9B. In this example, the eleven game sessions that are shown in FIG. 9B are shown listed under the players that created or spawned the game sessions. For example, <original game session 900> is listed under player 150A; thus, player 150A originated this game session 900. In addition, <game session 900A1B>, <game session 900A2>, and <game session 900B> are listed under player 150A, and thus player 150A spawned these game sessions. Under player 150B, <game session 900A> and <game session 900A1A> are listed, and thus player 150B spawned these game sessions. In addition, <original game session 901> is listed under player 150B, and thus player 150B originated this game session.

Note that the example graphical and/or textual lists, views, and representations as shown in FIGS. 9A through 9C are given by way of example and are not intended to be limiting. Game sessions and game session trees may be listed or displayed in various other formats than those shown, and may be sorted or organized according to one or more other properties than just family hierarchy or ownership, or by combinations of two or more properties. As examples, game sessions may be organized or sorted according to one or more time properties (e.g., creation date/time, play time (duration), etc.), or may be alphanumerically listed.

In some embodiments, the game system may list, or may provide one or more user interface elements at the game clients via which the player(s) can view, additional information for listed game sessions as shown in FIGS. 9A through 9C. For example, in some embodiments, a player may right-click on a listed game session and select a "show more info" or similar option from a popup menu. Again note that each game session shown in the listings may correspond to a particular game record. FIG. 10 shows an example of additional information for a previously played game session as recorded in a game record, according to at least some embodiments, and is not intended to be limiting. This additional information about a game session may be stored to or with a corresponding game record, and may be referred to as game record information. As shown in FIG. 10, game record information may include one or more of, but is not limited to, the following:

<session tag>—A tag, name, or identifier that uniquely identifies this game session. In some embodiments, session tags may be specified by the players. However, in some embodiments, session tags may be automatically generated.

<owner/spawned by [player]>—The player that created or spawned this game session.

<description>—A description of this game session. In some embodiments, a player or players may add or modify content to the description.

<date/time>—Real-world timestamp that, for example, indicates when this game session began.

<play time>—Real-world duration of the game session.

<players in session [player list]>—A list of all of the players that participated (as game characters) in this game session.

<session results>—Results of a game session may vary depending on the type of game. For example, in some games, session results may indicate a level or goal that was successfully reached or achieved in the game session. In some embodiments, session results may be or may include a chronological listing of significant events that occurred in the game session.

<session data/statistics>—Data and statistics for a game session may vary depending on the type of game. For example, in some "shooting" games, data may include shots fired, hits, and kills, and statistics may include "kill" rates or ratios. Statistics may include collective statistics for the players and/or individual statistics for each player.

<spawned from session [session tag]>—Identifies the game session from which this session was spawned (i.e., this session's parent), if any.

<spawned at [game universe timeline point]>—Identifies the point in the parent session at which this child session was spawned.

<spawned sessions [session tag(s)]>—Lists one or more child sessions spawned from this session, if any.

Organizing and displaying game sessions hierarchically and in other forms as illustrated in FIGS. 9A through 9C, and displaying additional information for game sessions as illustrated in FIG. 10, may, for example, allow the players to view information on and analyze all game sessions played from an original game session. For example, a player may determine which player(s) have generated the most activity in game play. As another example, in games that involve strategy and in which the mechanics are relatively set or fixed, a hierarchical representation of game sessions may allow players to determine best strategies for game play by analyzing the branches of the hierarchy.

FIG. 11 shows an example game record, according to at least some embodiments, and is not intended to be limiting. As previously noted, a game record 1100 viewed as a container for data that records the corresponding game session in format(s) that allow the game session to be replayed as described herein. Each game record 1100 may represent a particular timeline with a particular sequence of events that occurred in the game universe during the recorded game session. As shown in FIG. 11, in at least some embodiments, a game record 1100 may include one or more of, but is not limited to, game record information 1110, player profile snapshots 1120, game session metadata 1130, and game session video 1140.

As shown in FIG. 11, in at least some embodiments, a game record 1100 may include game record information 1110 that includes information about the respective game session, for example game record information as illustrated in FIG. 10.

In at least some embodiments, a game record 1100 may include game session metadata 1130, for example game session metadata as illustrated in FIGS. 7A and 7B. In at least some embodiments, the game session metadata 1130 may include an initial game state from which the game universe is initialized and from which the game timeline is launched, and entries each indicating a current game state at a specified time as the game session progresses that may be used to regenerate the game session universe for display to the players via their respective game clients. In at least some embodiments, the game session metadata 1130 may include metadata corresponding to the perspective of two or more player's characters involved in the game session so that the different perspectives can be presented to the respective players during playback as necessary. In some embodiments, playing back a game session may involve playing back the game session to the client device(s) of one or more players according to the game session metadata 1130 from the game record 1100 until a spawn event generates a new timeline and new game session as illustrated in FIGS. 1B, 1C, 6A, and 6B. Upon the spawn event, the game system logic/execution component may begin normal game execution for the new game session, with the game play of one or more characters simulated by the game system according to respective player profile(s) if necessary.

In some embodiments, a game record 1100 may include game session video 1140. In some embodiments, playing back a game session from a game record 1100 may at least initially involve playing back the video 1140 as recorded in the game record. In some embodiments, the video 1140 may include two or more different video streams each corresponding to the perspective of a different player's character involved in the game session so that the different perspectives can be presented to the respective players during playback as necessary. In some embodiments, playing back a game session may involve playing back the video 1140 to the client device(s) of one or more players until a spawn event generates a new timeline and new game session as illustrated in FIGS. 1B, 1C, 6A, and 6B. Upon the spawn event, the game system logic/execution component may begin normal game execution for the new game session, with the game play of one or more characters simulated by the game system according to respective player profile(s) if necessary.

In some embodiments, a game record 1100 may include one or more player profile snapshots 1120 that may be captured and stored to the game record 1100 during or at the end of the game session that is recorded. Each player profile snapshot 1120 may record the player profile, at the time of the game session, of a respective player that is involved in the game session. Example player profiles are illustrated in FIGS. 8A and 8B. The player profile snapshot(s) 1120 may, for example, be used in simulating the play of one or more respective characters in a game session being played back after a spawn event has generated a new timeline as illustrated in FIGS. 1C and 6B.

In some embodiments, when a player steps into and takes control of a character in the game session, the player inherits the attributes from the player's profile as recorded in the player profile snapshots 1120 at the time that the game session was originally played. As the player interacts with the game, the player's attributes in the previously recorded profile may be updated according to the player's game play. Alternatively, in some embodiments, when a player steps into and takes control of a character in the game session, the player assumes the attributes from the player's current profile rather than from the player profile snapshots 1120.

In some embodiments, the game system may provide one or more interfaces via which players may view their respective player profiles at the times of past game sessions as recorded in the snapshots 1120 in the game records 1100, and may compare their game playing attributes as recorded in the snapshots 1120 at the times of the past game sessions to their current player profiles if desired.

Character Simulation and Playback Notification

Figure 4A:
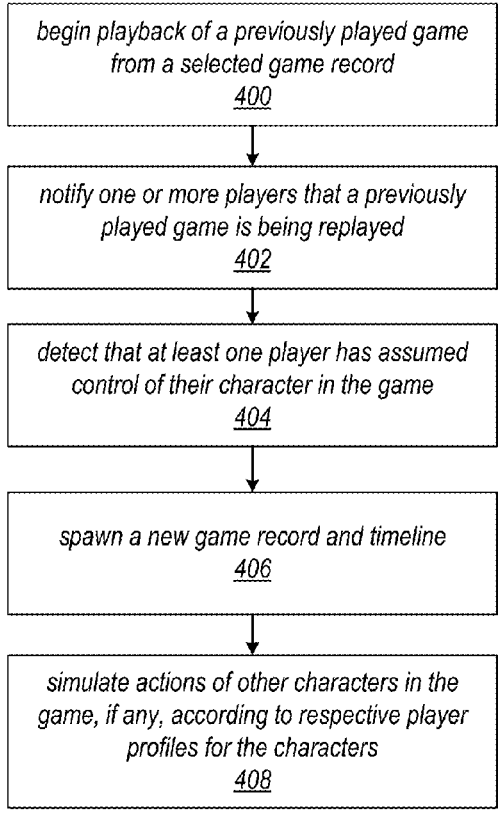
FIG. 4A is a high-level flowchart of a method for notifying players of a game being played back and for player(s) assuming control of their character(s) during the playback, according to at least some embodiments.

FIG. 4A is a high-level flowchart of a method for notifying players of a game being played back and for player(s) assuming control of their character(s) during the playback, according to at least some embodiments. As indicated at 400, a player or players may begin playback of a previously played game session from a selected game record. The game system may regenerate the game universe that includes the game session's context, characters, and environment from the information stored in the selected game record, and may begin playing back the game session as recorded (e.g., generating and rendering the state of the game universe as it progresses along the timeline indicated by the game record.) The player(s) may view the playback of the game session, for example via one or more client devices. In at least some embodiments, each of the players may view the playback in ghost mode from the perspective of their respective character. In ghost mode, a player views the replay of the game session without actively participating via their character.

Figure 4B:
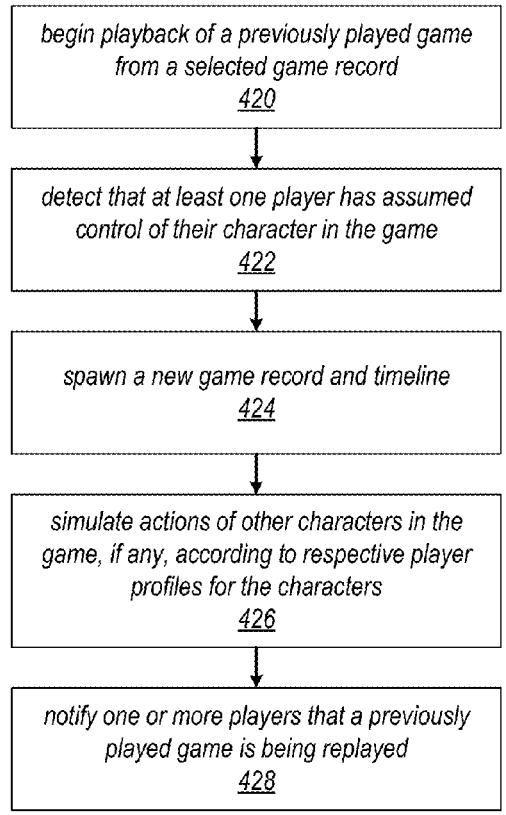
FIG. 4B is a high-level flowchart of an alternative method for notifying players of a game being played back and for player(s) assuming control of their character(s) during the playback, according to at least some embodiments.

As indicated at 402, one or more players may be notified that the game session is being replayed from the game record. In at least some embodiments, the player(s) may be notified as soon as the replay has begun. Alternatively, as shown in FIG. 4B, player(s) may not be notified of the replay of a game session unless or until at least one other player assumes control of character(s) in the game universe, thus spawning a new timeline. In at least some embodiments, at least some of the notifications may be initiated by a player that initiated the replay of the game session, for example by text messaging the other player(s). Alternatively, at least some of the notifications may be automatically initiated by the game system upon detecting a particular event (e.g., initiation of replay of the game session from a selected game record, or alternatively the assumption of a character by a player during a replay). The game system may notify players using one or more communications channels (e.g., text messaging, alert messaging, email, etc.) In at least some embodiments, each of the players that is notified of the replay may choose to view the playback in ghost mode from the perspective of their respective character.

As indicated at 404, the game system may detect that one or more players have assumed control of the players' characters in the game session being played back. As indicated at 406, in response to the player(s) assuming control of their character(s), the game system spawns a new game record and new timeline from the selected game record and original timeline, and begins recording new game states to the new game record. As indicated at 408, in at least some embodiments, once the player(s) steps into a game session being replayed and thus cause a spawn event, the game system may begin simulating actions of one or more other characters involved in the game session according to the player profiles corresponding to the characters. Note that, in at least some embodiments, other players may choose to view the playback in ghost mode from the perspective of their respective characters, or alternatively may choose to step into and take control of their characters in the new game session.

FIG. 4B is a high-level flowchart of an alternative method for notifying players of a game being played back and for player(s) assuming control of their character(s) during the playback, according to at least some embodiments. As indicated at 420, a player or players may begin playback of a previously played game session from a selected game record. The game system may regenerate the game universe that includes the game session's context, characters, and environment from the information stored in the selected game record, and may begin playing back the game session as recorded (e.g., generating and rendering the state of the game universe as it progresses along the timeline indicated by the game record.) The player(s) may view the playback of the game session, for example via one or more client devices. In at least some embodiments, the player(s) may at least initially view the playback in ghost mode from the perspective of their respective characters.

As indicated at 422, the game system may detect that one or more players have assumed control of the players' characters in the game session being played back. As indicated at 424, in response to the player(s) assuming control of their character(s), the game system spawns a new game record and new timeline from the selected game record and original timeline, and begins recording new game states to the new game record. As indicated at 426, in at least some embodiments, once the player(s) steps into a game session being replayed and thus cause a spawn event, the game system may begin simulating actions of one or more other characters involved in the game session according to the player profiles corresponding to the characters.

As indicated at 428, after detecting the spawn event at element 424, one or more players may be notified that the game session is being replayed from the game record. In at least some embodiments, the notifications may be initiated by a player that has assumed control of a character in the game session. Alternatively, at least some of the notifications may be automatically initiated by the game system upon detecting that at least one player has assumed control of a character in the game session. In at least some embodiments, the notified players may choose to view the new game session in ghost mode from the perspective of their respective characters, or alternatively may choose to step into and take control of their characters in the new game session.

Referring to FIGS. 4A and 4B, in some embodiments, notifications may be generated upon initiation of a playback of a game session and upon spawning of a new game session during the playback of the game system. In some embodiments, the game system may allow players to configure notification options, for example via an interface presented to the players via a game client on their respective client devices. For example, the game system may allow a player to specify whether the player wants to be notified upon initiation of a replay of a game session and/or upon spawning of a new game session during a replay. As another example, the game system may allow a player to specify and configure preferred notification channels, e.g. email or text message.

The elements of FIGS. 4A and 4B are explained in more detail below in reference to FIGS. 1B, 1C, and 1D.

In at least some embodiments, game system 100 may include player simulation 112 logic (e.g., an artificial intelligence (AI) engine) that can simulate game play of a given player 150 in a game session by controlling the actions of the player's character 152 according to the player's profile 140. Thus, as shown in FIG. 1C, when player 150B steps into character 152B in the previously recorded game session being played back from game record 130A, spawning a new timeline and new game record 130B, the actions of one or more other characters 152 in the game may from that point forward at least initially be controlled by player simulation 112 logic based on the player profiles 140 corresponding to the players 150/characters 152. In other words, after the spawn event, the characters' actions in the game are not played back from a previous recording, but are instead either controlled by an actual player 150 via a game client 122 or are simulated by player simulation 112 logic according to the respective players' profiles. In the example shown in FIG. 1C, after player 150B steps into the game session, character 152B is controlled by player 150B via game client 122B, while the actions of characters 152A and 152B are controlled by player simulation 112 logic according to the players' attributes as indicated in the profiles 140 of their corresponding players 150 (players 150A and 150C as shown in FIG. 1A). As the game play diverges from the original universe/timeline on the new timeline, the simulated characters 152A and 152B may respond to new events according to the corresponding player's actual, live playing characteristics and attributes as recorded in the profiles 140.

In at least some embodiments, once a replay of a game session has been initiated from a game record 130A by a player 150A as illustrated in FIG. 1B, one or more other players 150 (e.g., players 150A and 150C) may also access and watch the replay from their respective client devices 120. In at least some embodiments, the other players 150 may be allowed to take control of their respective characters 152 at some point during the replay if desired. In some embodiments, the other players 150 may not be allowed to take control of their characters 152 until (or after) the player 150B that initiated the playback steps into and takes control of the player's character 152B as illustrated in FIG. 1C and thus spawns a new timeline. However, in some embodiments, the other players 150 may be allowed to take control of their characters 152 as soon as replay of the game session begins, whether or not the player 150B that initiated the playback takes control of their character 152B.

Referring to FIGS. 1B and 1C, in at least some embodiments, when a player 150B replays a previously recorded game session from a game record 130A, or alternatively when the player 150B steps into the previously recorded game session that is being replayed, one or more other players 150 (e.g., players 150A and 150C of FIG. 1A) that were involved in the original game session may be notified that a game session involving their respective game characters 152 is being replayed, and may be invited to participate in the replay session and thus in a new timeline that may be spawned from the original timeline as shown in FIG. 1C.

In at least some embodiments, an invitation to participate in a game session being replayed may be initiated by the player 150B who initiated the replay using one or more communications channels such as social media, text messaging, email, telephone, etc. In some embodiments, the game client 122 may include a "notify other players" interface element that allows a player 150 to optionally invite one or more of the other players 150 to participate in the game replay if desired.

In some embodiments, the game system 100 may include a notification component that detects when a game session is being replayed from a game record 130A by a player 150B, determines one or more other players 150 that have characters 152 that were involved in the original game session (e.g., players 150A and 150C of FIG. 1A), and automatically generates and sends a notification to the one or more other players 150. The notification may invite the other players 150 to view the replay and/or may invite the other players 150 to assume control of their players in the game session being replayed. In some embodiments, the notification may include one or more hot links that a player 150 may select to automatically go to (or open) the game session on the player's client device 120. In some embodiments, the notifications may be automatically generated and sent when the replay of the game session is initiated from the game record 130A by the player 150B as illustrated in FIG. 1B. Alternatively, in some embodiments, the notification may be automatically generated and sent only when the player 150B steps into and takes control of their character 152B in the game session and thus causes a new timeline to be spawned as illustrated in FIG. 1C. In at least some embodiments, to map characters 152 in a game session being replayed to particular players 150, and to notify the identified players 150 of the replay, the game system 100 may access game data 160 to map characters 152 to players 150 and to locate each player 150's information such as a preferred notification method (e.g., a phone number for text messaging), client device 120 information, and so on.

Figure 1D:
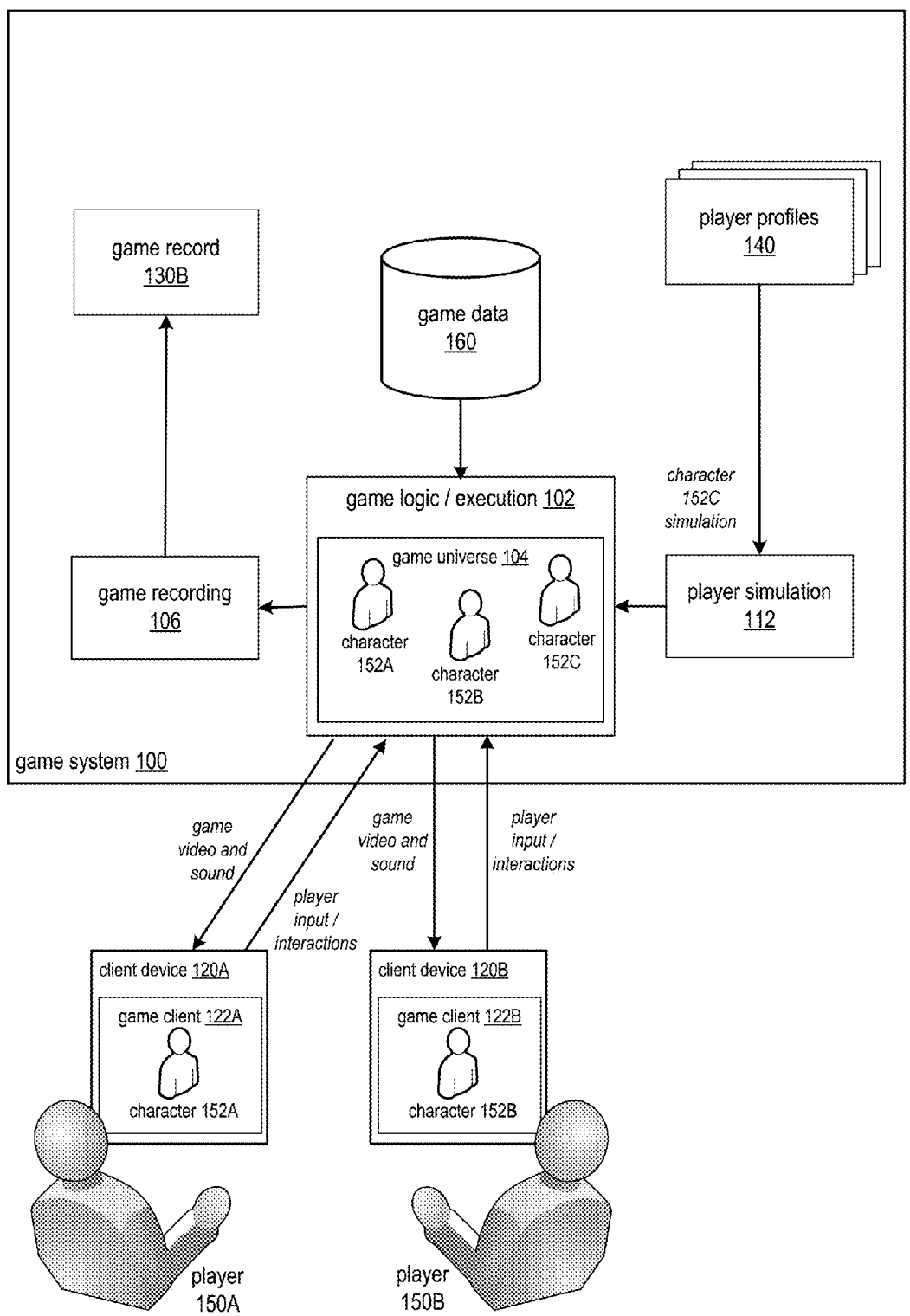
FIG. 1D illustrates another player stepping into the respective player's character during replay of a previously recorded game record, according to at least some embodiments.

FIG. 1D graphically illustrates a second player 150A stepping into the player's character 152A during replay of a game session from a previously recorded and stored game record, according to at least some embodiments. Player 150B may have initiated the playback of a game session from a game record 130A as shown in FIG. 1A, and may have subsequently stepped into and taken control of game character 152B in the game session, thus spawning a new timeline and a new game record 130B, as shown in FIG. 1C. Player 150A may have received a notification of the replay, either from player 150B or as automatically generated by a notification component of game system 100 upon detecting replay of a game session involving player 150A's character 152A. In at least some embodiments, player 150A may optionally choose to just watch the replay without actively participating via the player's character 152A if desired. However, game system 100 may provide an interface via game client 122A that enables the player 150A to step into and take control of the actions of game character 152A during the replay of the game session if and when the player 150A desires to do so. Once the player 150A takes control of character 152A, player simulation 112 logic is no longer simulating game play of the player 150A through character 152A and according to player 150A's profile 140. Note that character 152C may still be controlled in the game session by player simulation 112 logic based on the player profile 140 corresponding to player 150C, even though player 150A is controlling character 152A via game client 122A and player 150B is controlling character 152B via game client 122B. However, player 150C may join in the game session at any time by taking control of character 152C if and when desired.

While not shown in FIGS. 1C and 1D, in at least some embodiments, once one or more players 150 step into a game session being replayed from a previously stored game record 130A and thus spawn a new timeline and game record 130B, a player monitoring 108 component of the game system 100 (as shown in FIG. 1A) may begin monitoring various actions of the players 150 that are actually controlling their respective characters 152 in the game universe 104 from the client devices 120, and may update the respective player profiles 140 for the respective players 150 according to the monitored actions. However, note that the monitoring 108 component may not monitor and may not update the profiles 140 of any players 150 that are not currently controlling actions of their characters 152 through game clients 122, since the game play of these players 150 is being simulated by player simulation 112 logic.

While not shown in FIGS. 1A through 1D, in at least some embodiments, a player 150 may choose to step out of a character 152 during a game session (either an initial game session or a game session that is being replayed) and thus relinquish control of the character to player simulation 112 logic.

Variations on Game Session Recording and Playback

FIGS. 1A through 1D are primarily directed to recording and replaying game sessions originally involving one or more human players. For example, in FIG. 1A, players 150A through 150C are involved in the original game that is recorded to a game record 130 and stored to game records 132. However, referring to FIG. 1A and player simulation 112 from FIG. 1C, in at least some embodiments, a game record 130 may be generated by initiating a game session in which one or more, or even all, of the characters 152 are at least initially controlled by the player simulation 112 logic according to the player's profiles 140. For example, a player 150 may choose to generate an original game record 130 in which the player 150 controls a character playing against (or in cooperation with) one or more characters 152 whose actions are being simulated by the game system 100 according to the players' profiles 140. As another example, a player 150 may choose to generate an original game record 130 in which all of the characters 152, including the player's character 152, are simulated by the game system 100 according to the players' profiles 140. These game records so generated can be stored, selected and replayed as illustrated in FIGS. 1B through 1D, with the players 150 stepping into (or out of) their characters 152 as desired.

Game Session Marketing

A game system that implements an embodiment of the methods and apparatus for replaying game sessions as described herein in reference to FIGS. 1A through 4 may allow players to offer or market recorded game sessions to other players. In at least some embodiments, a player (for example, a skilled or known player for a particular online game) can record game sessions involving the player's game character and offer the recorded game sessions to others for replay. In at least some embodiments, a player that obtains a recorded game session from another player may choose to participate in the replay by assuming control of a character in the game and playing against (or with, in cooperative games) the original player's character. In at least some embodiments, if a player steps into a game session so obtained by taking control of a character, a new universe/timeline may be spawned in which the player participates with the other player's character as controlled by the game logic according to the other player's profile. The other player's profile may be provided with the recorded game session or may be otherwise obtained or accessed. In at least some embodiments, these recorded game sessions may be offered online (or through other channels), for example via a website of the game developer. In some embodiments, replays of the game sessions may be offered for a fee, in exchange for virtual or real currency, or in some cases for free. Alternatively, in some embodiments, instead of or in addition to offering replays of game sessions from game records, copies of the game records themselves may be obtained in exchange for virtual or real currency, or in some cases for free.

Figure 5:
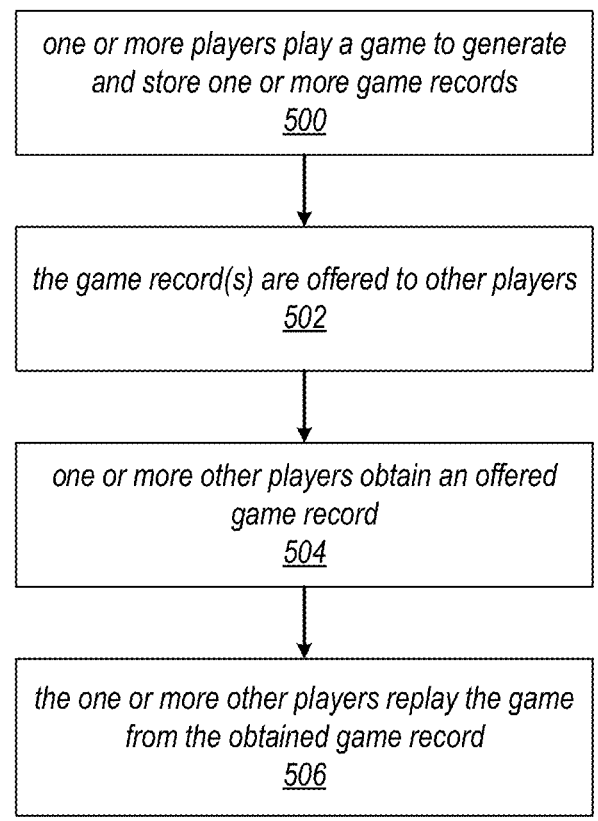
FIG. 5 is a high-level flowchart of a method for offering generated game records to other players for replay, according to at least some embodiments.

FIG. 5 is a high-level flowchart of a method for offering generated game records to other players for replay, according to at least some embodiments. As indicated at 500, one or more players may play one or more sessions of a game implemented by a game system to generate and store one or more game records, for example according to the methods as illustrated in FIGS. 1A and 2. For a particular game session, the game system may generate a game universe that includes the game session's context, characters, and environment. In at least some embodiments, each of the one or more players that participate in the game sessions may assume a character in the game, and may control the character in the game universe using a game client instance on a client device. However, in at least some embodiments, at least one of the characters in a game session may instead be controlled by logic (e.g., artificial intelligence (AI) logic) of the game system. A game record may represent a particular timeline with a particular sequence of events that occurred in the game universe during the recorded game session. FIG. 6A shows an example original timeline for a game session, and FIG. 7A shows game session metadata from an example game record according to at least some embodiments. FIG. 11 shows an example game record, according to at least some embodiments.

As indicated at 502, one or more of the game records generated at 500, or replays thereof, may be offered to, provided to, shared with, or marketed to, other players. As a non-limiting example, the game records may be offered online for downloading, or for replay from a remote network site, via a website of the game developer, a website of the player(s) that generated the game records, or a website of a third party. In at least some embodiments, the game records may be offered via a user interface through which potential clients can view graphical and/or textual lists of the offering player's game session trees. For example, in some embodiments, lists of a player or players' game sessions and/or game session tree(s) as illustrated in FIGS. 9A, 9B, and/or 9C may be displayed to potential clients via a website or other channel; the website may include user interface elements that allow the client(s) to select and purchase replays of desired ones of the game sessions from the corresponding game records, or to select and purchase the game records themselves. As another example, the game records may be offered for sale on physical media such as CDs or DVDs by brick-and-mortar or online stores. In at least some embodiments, the game records, or replays of the game sessions in the game records, may be offered in exchange for virtual or real currency, or in some cases for free. In at least some embodiments, one or more of the game records may be offered as add-on game packages for the game, or may be bundled with a game upon purchase of the game. In at least some embodiments, a player or players may purchase or otherwise obtain rights to a particular game record or records that allow the player(s) to replay the game record(s) as often as desired. Alternatively, a player or players may purchase or obtain rights to one replay, or to a limited number of replays, of a given game record or records. As an alternative, in some embodiments, different gaming groups may be allowed to swap or trade game records so that the players in one gaming group can replay game sessions recorded by the other gaming group.

In at least some embodiments, player profile(s) for the player(s) that recorded the game record(s) may be bundled or provided with the game record(s) that are offered to, provided to, shared with, or marketed to, other players at 502. Alternatively, the player profile(s) may not be provided with the game record(s), but may instead be accessed from a remote location (e.g., a website) where the player profile(s) are stored if necessary when replaying one of the game records. FIGS. 8A and 8B show example player profiles, according to at least some embodiments.

As indicated at 504, one or more players may obtain an offered game record or records, or alternatively may obtain rights to replay the game record(s) one or more times. As just one example, a player may access a website via a client device, select a desired game record that records a game session played by a well-known player of the game, and purchase or otherwise obtain rights to replay the particular game session stored in the game record one or more times via a game client implementation on the client device (or on a different client device). Note that rights to replay a game session may allow two or more players to participate in a replay of the game.

As indicated at 506, the one or more players may then replay the game session(s) one, two, or more times from the obtained game record(s) according to the obtained rights. In at least some embodiments, the player(s) may view the playback of a game session from an obtained game record as if watching a video of the original game session, for example as illustrated in FIG. 1B. In at least some embodiments, the player(s) may choose to participate in the replay of the game session by assuming control of a character or characters in the game and playing against (or with, in cooperative games) the original player's or players' character(s), for example as illustrated in FIGS. 1C, 1D, and 3. In at least some embodiments, once a player steps into and interacts with the game universe in the game session being replayed from an obtained game record, the game system begins simulating play of the original player(s) that recorded the game session according to the player profile(s). In at least some embodiments, if a player or players steps into a game session being replayed from an obtained game record by taking control of a character or characters, a new timeline may be spawned in the universe in which the player(s) participates with the original player's or players' character(s) as controlled by the game logic according to the original player's or players' profiles, and a new game record may be spawned off of the original game record.

In at least some embodiments, the players may be allowed to store, replay, and share new game records spawned from the obtained game records. However, in at least some embodiments, storing, replaying, and/or sharing of the new game records spawned from the obtained game records may be limited or restricted by the game system or by other entities to protect rights of the players that generated and offered the original game records.

Example Gaming Environments

Embodiments of game systems that implement the methods and apparatus for replaying game sessions as described herein in reference to FIGS. 1A through 11, for example game system 100 as illustrated in FIGS. 1A through 1D, may be implemented in the context of a service provider that provides virtualized resources (e.g., virtualized computing resources, virtualized storage resources, virtualized database (DB) resources, etc.) on a provider network to clients of the service provider, as illustrated in FIG. 12. Virtualized resource instances may be provisioned via one or more provider network services 1510, and may be rented or leased to the clients of the service provider, for example to a game provider 1590 client. At least some of the resource instances on the provider network 1500 (e.g., computing resources 1524) may be implemented according to hardware virtualization technology that enables multiple operating systems to run concurrently on a host computer, i.e. as virtual machines (VMs) on the host.

The provider network 1500, via the services 1510, may enable the provisioning of logically isolated sections of the provider network 1500 to particular clients as client private networks on the provider network 1500. At least some of a client's resources instances on the provider network 1500 may be provisioned in the client's private network. For example, in FIG. 12, game system 1520 may be implemented as or in a private network of game provider 1590 that is provisioned on provider network 1500 via one or more of the services 1510.

The provider network 1500, via the services 1510, may provide flexible provisioning of resource instances to clients in which virtualized resource instances can be automatically added to or removed from a client's configuration on the provider network 1500 in response to changes in demand or usage, thus enabling a client's implementation on the provider network 1500 to automatically scale to handle computation and/or storage needs. For example, one or more additional computing resources 1524 may be automatically added to game system 1520 in response to an increase in game client 1580 participation in the game implemented by game system 1520; if and when usage drops below a threshold, the computing resources 1524 can be removed.

In at least some embodiments, game provider 1590 may access one or more of services 1510 of the provider network

1500 via application programming interfaces (APIs) to the services 1510 to configure a game system 1520 on the provider network 1500, the game system 1520 including multiple virtualized resource instances (e.g., computing resources 1524, storage resources 1532, DB resources 1534, etc.).

Virtualization services 1512 may include one or more of, but are not limited to, one or more hardware virtualization services for provisioning computing resource 1524, one or more storage virtualization services for provisioning storage resources 1532, and one or more database (DB) services for provisioning DB resources 1534. In some implementations, game provider 1590 may access one or more of these virtualization services 1512 via respective APIs to provision and manage respective resource instances in game system 1520. However, in some implementations, game provider 1590 may instead access another service (e.g., a game system service 1514 or streaming service 1516) via an API to the service; the other service may then interact with one or more of the virtualization services 1512 on behalf of the game provider 1590 to provision resource instances in the game system 1520.

The service provider may provide game system service(s) 1514 to clients of provider network 1500. Game system service(s) 1514 may include one or more services that game provider 1590 may leverage to implement a network-based game as a game system 1520 on provider network 1500. As noted above, game system service(s) 1514 may leverage virtualization services 1512 to provision various resources in game system 1520.

In some embodiments, game system service(s) 1514 may include a game backend service for creating, deploying, and managing backend or server-side game components on provider network 1500. In at least some embodiments, the game backend service may manage, for the client, the deployment, scaling, load balancing, monitoring, version management, and fault detection and recovery of the server-side game logic. In at least some embodiments, the game backend service may provide fully managed backend containers for server-side game components.

In some embodiments, game system service(s) 1514 may include a game engine service for creating, deploying, and running network-based games, including but not limited to game logic/execution 1522 components and game client 1580 components. The game engine service may include, but is not limited to, 2D and/or 3D game engines and an integrated development environment (IDE) for developing code for the 2D and/or 3D game engines. The game engine service may also include or may leverage the game backend service for provisioning and managing the backend, server-side components. Game provider 1590 may leverage one or more of game system services 1514 to implement an online game and to provision the game system 1520 on provider network 1500 for hosting the game. In at least some embodiments, the game engine service may also be leveraged by the game provider 1590 to develop and build game clients 1580 for various operating system (OS) platforms on various types of client devices (e.g., tablets, smartphones, desktop/notebook computers, etc.).

The service provider may also provide a streaming service 1516 to clients of provider network 1500. Many consumer devices, such as personal computers, tables, and mobile phones, have hardware and/or software limitations that limit the devices' capabilities as game clients to process and render data in real time. In at least some embodiments, a streaming service 1516 may allow output of a resource-intensive game implemented by game system 1520 on provider network 1500 to be rendered on the provider network 1500 and streamed from the provider network 1500 to "thin" game clients implemented on consumer devices such as personal computers, tablets, and mobile phones. In at least some embodiments, each thin game client may implement a streaming service client interface 1722 as shown in FIG. 14 for receiving and processing data received according to the streaming service 1516 on the client device 1750. Using the streaming service 1516, the game system 1520 can be scaled to handle computational and storage needs, regardless of the types of devices that the game clients 1580 are implemented on. FIG. 14 illustrates an example network-based gaming environment in which a streaming service 1516 is used to provide rendered game video and sound to thin game clients, according to at least some embodiments.

Figure 15:
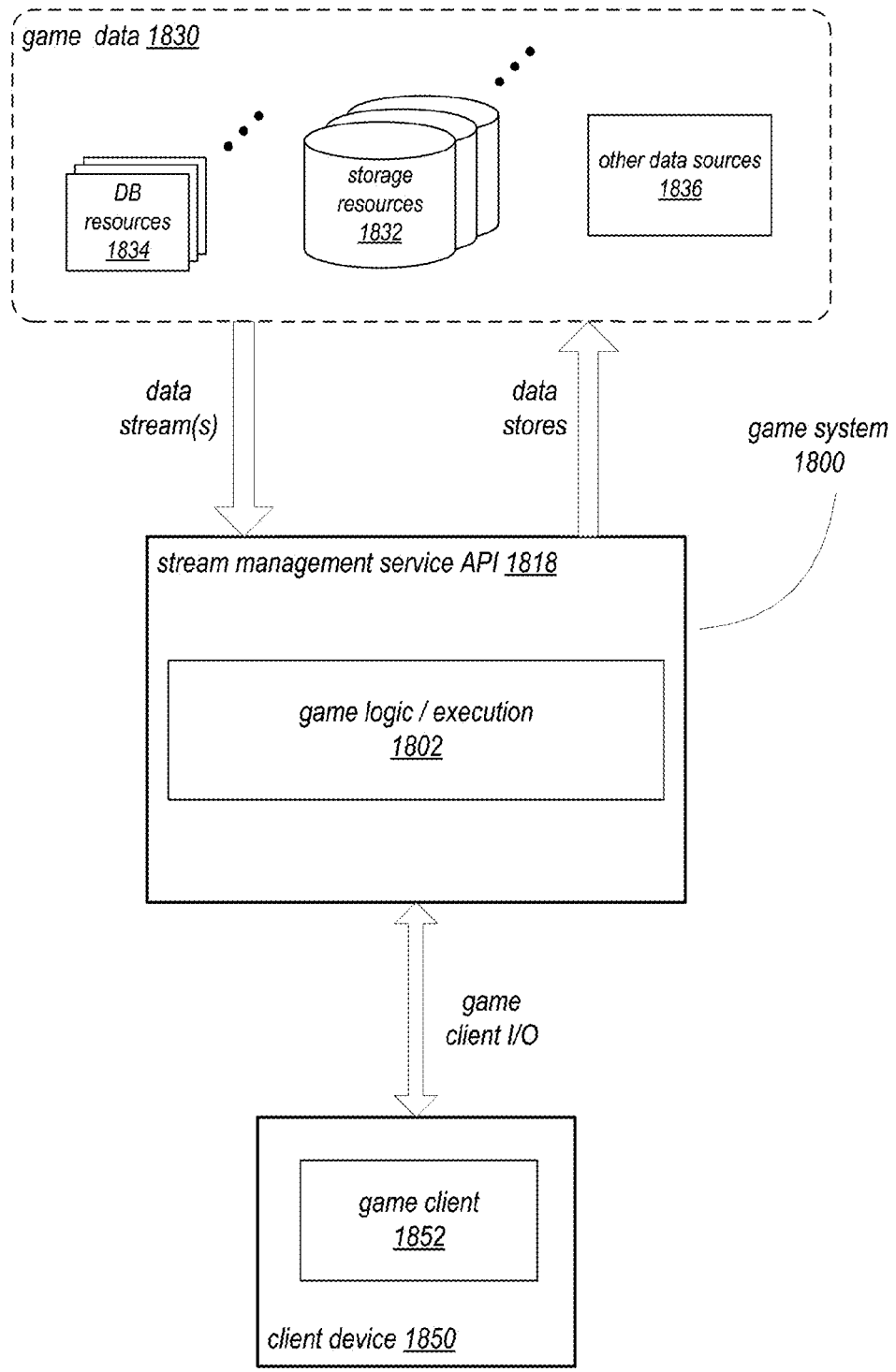
FIG. 15 is a high-level illustration of a gaming environment that leverages a stream management service, according to at least some embodiments.

As shown in FIG. 12, in some embodiments, the service provider may also provide a stream management service 1518 to clients of provider network 1500. Game developers may leverage the stream management service 1518 in implementing a game system 1520. FIG. 15 is a high-level illustration of a gaming environment that leverages a stream management service 1518, according to at least some embodiments. The stream management service 1518 may provide tools and interfaces including an application programming interface (API) 1818 via which a game developer may implement a game system 1800 that leverages one or more features of the stream management service 1518 via the API 1818. In at least some embodiments, the stream management service 1518 is a fully managed service for real-time processing of streaming data at large scales. The game developer can leverage the stream management service 1518 via API 1818 to collect and process high volumes of data per hour from multiple data sources in real-time, thus allowing the game developer to easily build and implement a game system 1800 according to the stream management service API 1818 that processes information in real-time from multiple data sources when executing a game session according to a game logic/execution 1802 engine. The data sources may include sources on the provider network and/or sources external to the provider network. Provider network sources may, for example, include DB resources 1834, storage resources 1832, and/or other data sources 1836 such as computation resources. The stream management service API 1818 may also enable sending data (e.g., data streams) to one or more destinations, such as DB resources 1834 and/or storage resources 1832 on the provider network, as well as to game client(s) 1852 on client device(s) 1850.

Referring to FIG. 12, game provider 1590 may develop and deploy an online game as game system 1520, leveraging one or more of services 1510 to configure and provision game system 1520. One or more computing resources 1524 may be provisioned and configured to implement game logic/execution 1522. In some embodiments, as shown in FIG. 12, two or more computing resources 1524 may be configured to implement game logic/execution 1522. However, in some embodiments, an instance of game logic/execution 1522 (e.g., a 2D or 3D game engine) may be implemented as or on each of one or more computing resource 1524 instances. For example, in some implementations, each computing resource 1524 instance may be a virtual machine instance that is spun up from a machine image of the game provider's game engine stored on storage resource(s) 1532.

Storage resources 1532 and/or DB resources 1534 may be configured and provisioned for storing, accessing, and managing game data including but not limited to game records and player profiles as illustrated in FIGS. 1A through 11. Game system interface(s) 1526 may be configured to provide gaming I/O interfaces and protocols to the game clients 1580.

In at least some embodiments, the game system interface(s) 1526 may include or may leverage a streaming service 1516 interface as described above. Game clients 1580 may be developed and built for various operating system (OS) platforms on various types of client devices (e.g., tablets, smartphones, desktop/notebook computers, etc.). Game clients 1580 may include thick game clients as illustrated in FIG. 14 and/or thin game clients as illustrated in FIG. 13.

Once game system 1520 is established, players can obtain game clients 1580 from game provider 1590 via one or more channels (e.g., downloading a game client from a game provider 1590 website or from a third party website such as an online site for acquiring and downloading various applications, including but not limited to games, for various types of consumer devices including but not limited to mobile devices. One or more players may then participate in game sessions as illustrated in FIG. 1A and in FIG. 2 by interacting with game system 1520 via game system interface(s) 1526. Game logic/execution 1522 builds, maintains, and updates the game universe for a game session, the players interact in the game universe by controlling their characters using game clients 1580 on their client devices, the game system 1520 creates and stores the game record for the game session to game data 1530, and the game system 1520 updated the players' profiles according to the players' game play in the session.

One or more players may also replay, and participate in the replay of, game sessions as illustrated in FIG. 1B through 1D and in FIG. 3 by interacting with game system 1520 via game system interface(s) 1526 to select a game session to be replayed, view a replay of the game session, and step into the game session to assume control of character(s) is so desired. In at least some embodiments, the game system 1520 spawns a new timeline and a new game record in response to at least one player assuming control of a character during playback. In at least some embodiments, the game system 1520 may automatically notify one or more players that a previously played game is being replayed from a stored game record, for example as illustrated in FIG. 4A or in FIG. 4B.

In at least some embodiments, game records of game sessions may be generated by one or more players using game system 1520, and the game records may then be provided to other players for replay, for example as illustrated in FIG. 5. As a non-limiting example, the game records may be offered online via a website of the game provider 1590, a website of the player(s) that generated the game records, or a website of a third party. Players that obtain an offered game record may then replay the game session using game system 1520. The players may view the playback of the game session as if watching a video of the original game session, or alternatively may choose to participate in the replay of the game session by assuming control of a character or characters in the game and playing against (or with, in cooperative games) the original player's character. In at least some embodiments, once a player steps into and interacts with the game universe in the game session being replayed from an obtained game record, the game system begins simulating play of the original player that recorded the game session according to the player's profile.

FIG. 13 illustrates an example network-based gaming environment that uses thick clients, according to at least some embodiments. Game system 1600 may include game logic/execution 1602 component, front-end game system interface(s) 1604 for receiving game input from and sending game output to game clients 1652, and backend data interface(s) 1630 for storing and retrieving game data 1610 including but not limited to game records and player profiles as described herein. Game logic/execution 1602 component may generate a game universe that includes the game session's context, characters, and environment. Based upon players' inputs and interactions with the game universe and on other game factors (e.g., scripted events and/or a randomness component), a game session progresses along a timeline, with the game universe being modified and updated by game logic/execution 1602 component accordingly.

A client device 1650 may implant a thick game client 1652. Thick game client 1652 may implement a 2D or 3D rendering 1606 component. Rather than game logic/execution 1602 performing full rendering of the 2D or 3D game universe as the universe progresses along the timeline, game universe data may be periodically, aperiodically, or continuously sent to the thick game client 1652 via game system interface(s) 1604. On the client device 1650, the rendering 1606 component may render, display, and update a 2D or 3D representation or view of the game universe according to the received game universe data.

FIG. 14 illustrates an example network-based gaming environment in which a streaming service is used to provide rendered game video and sound to thin game clients, according to at least some embodiments. Game system 1700 may include game logic/execution 1702 component, front-end game system interface(s) 1704 for receiving game input from game clients 1752, and backend data interface(s) 1730 for storing and retrieving game data 1710 including but not limited to game records and player profiles as described herein. Game system 1700 may further include a 2D or 3D rendering 1706 component and a streaming service interface 1720. The streaming service interface 1720 may, for example, be implemented according to a streaming service 1516 as illustrated in FIG. 12. Returning to FIG. 14, game logic/execution 1702 component may generate a game universe that includes the game session's context, characters, and environment. Based upon players' inputs and interactions with the game universe and on other game factors (e.g., scripted events and/or a randomness component), a game session progresses along a timeline, with the game universe being modified and updated by game logic/execution 1702 component accordingly.

Instead of implementing a thick game client as illustrated in FIG. 13, client device 1750 may implant a thin game client 1752. Thin game client 1752 may implement a streaming service client interface 1722. Rather than performing rendering of the 2D or 3D game universe on the client device 1750, rendering 1706 component of game system 1700 may render a 2D or 3D representation or view of the game universe as the universe progresses along the timeline. Streaming service interface 1720 may generate video from the rendering of the game universe and stream the video and accompanying sound to the thin game client 1752 according to a streaming service protocol. At the client device 1750, the streaming service client interface 1722 receives the stream from streaming service interface 1720, and the thin game client 1750 displays the video to the client device 1750.

Embodiments of a game system as described herein may be implemented according to a client-server model in which one or more devices (e.g., server devices) host most or all of the functionality of the game system and one or more client devices hosting game clients (the "clients") access the game system (the "server"), for example via an intermediate network such as the Internet, to play game sessions. However, embodiments of the game system may be implemented according to other models, for example according to a peer-to-peer model.

FIGS. 16A and 16B illustrate example peer-to-peer gaming environments, according to at least some embodiments. In the peer-to-peer model, at least some of the game functionality and components of a game system 100 as shown in FIG. 1A through 1D may be distributed among one, two, or more game peers 1922 implemented on the players' devices 1920. A device 1920 may be any of a variety of consumer devices including but not limited to desktop computer systems, laptop/notebook computer systems, pad/tablet devices, smartphone devices, game consoles, handheld gaming devices, and wearable gaming devices. Wearable gaming devices may include, but are not limited to, gaming glasses or goggles and gaming "watches" that are wearable on the wrist or arm. The game peers 1922 may participate in peer-to-peer relationships to execute game sessions, and each game peer 1922 may implement at least part of the game functionality and components of a game system 100 as illustrated in FIGS. 1A through 1D, for example game logic/execution 102, game recording 106, player monitoring 108, game playback 110, and player simulation 112. In addition, one or more of the peered devices 1920 may store game data 1960.

In some embodiments, different game peers 1922 may implement different parts of the game functionality and components of the game system. For example, in some embodiments, one of the game peers 1922 may perform game recording, while another game peer 1922 performs player monitoring. As shown in FIG. 16A, in some embodiments, one or more of the devices 1920 that are participating in the peer-to-peer model may serve as a store for game data 1960. Game data 1960 may include but is not limited to game records and player profiles as described herein. As shown in FIG. 16B, in some embodiments, at least a portion of game data 1960 may be stored to one or more remote game data stores 1980, for example using a storage virtualization service of a service provider network as illustrated in FIG. 12.

Illustrative System

In at least some embodiments, a computing device that implements a portion or all of the methods and apparatus for replaying game sessions in computer-based games as described herein may include a general-purpose computer system that includes or is configured to access one or more computer-accessible media, such as computer system 2000 illustrated in FIG. 17. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for replaying game sessions in computer-based games, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 15B, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 15B for implementing embodiments of methods and apparatus for replaying game sessions in computer-based games. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising;
one or more computing devices configured to implement a game system configured to:
store game records comprising previously played game sessions, each game session involving one or more game characters acting within a game universe along a game session timeline;
receive selection input from one of one or more client devices, said selection input selecting one of the stored game records for playback;
begin playback of the game session as recorded in the selected game record to at least one client device;
receive game input from a game client instance on one of the one or more client devices, said game input causing an action by one of the one or more game characters within the game universe; and
in response to said game input, spawn a new game session timeline from the game session timeline as recorded in the selected game record and generate a new game record for the new game session timeline.

2. The system as recited in claim 1, wherein, subsequent to said spawning a new game session timeline from the game session timeline as recorded in the selected game record, game play progresses on the new game session timeline according to additional game input received from at least one game client instance.

3. The system as recited in claim 1, wherein at least one game character in a given game session is controlled by player input to a game client instance on a client device.

4. The system as recited in claim 1, wherein the game system implements an online game, wherein the one or more computing devices that implement the game system are devices on a game provider network, and wherein the game client instances on the client devices access the game system via an intermediate network.

5. The system as recited in claim 4, wherein, to play back the game session as recorded in the selected game record to the at least one client device, the game system is further configured to render the game universe and stream video of the rendered game universe to the at least one game client instance over the intermediate network for display on respective client devices.

6. The system as recited in claim 4, wherein, to play back the game session as recorded in the selected game record to the at least one client device, the game system is further configured to send game universe data to the at least one game client instance over the intermediate network, wherein at least one game client instance is configured to render and display the game universe on the respective client device according to the received game universe data.

7. The system as recited in claim 1, wherein the selected game record includes video of the game session recorded from a plurality of different perspectives in the game universe, and wherein, in said playback of the game session as recorded in the selected game record, the game system is configured to stream the video from at least two of the different perspectives to respective ones of the client devices.

8. The system as recited in claim 1, wherein the selected game record includes game session metadata for the game session, and wherein, in said playback of the game session as recorded in the selected game record, the game system is configured to render at least two different perspectives of the game universe from the game session metadata and stream video from the different perspectives to respective ones of the client devices.

9. The system as recited in claim 1, wherein the game system implements a multiplayer game, wherein a game session on the game system involves two or more game characters, wherein a given game character in a game session corresponds to one of two or more players, and wherein at least one of the two or more game characters in a game session is controlled by respective player input to a game client instance on a client device.

10. The system as recited in claim 1, wherein the one or more computing devices that implement the game system include at least one of the one or more client devices.

11. A method, comprising:
replaying, by a game system implemented on one or more computing devices, at least a portion of a previously played game session;
receiving, by the game system during said replaying, input from a game client to which the game session is being replayed, said input indicating an action by one of one or more game characters involved in the game session being replayed; and
in response to said input, spawning a new game session from the previously played game session, wherein a timeline of the new game session diverges from a timeline of the previously played game session.

12. The method as recited in claim 11, wherein, subsequent to said spawning a new game session timeline from the previously played game session, game play progresses on the new game session timeline according to additional game input received from at least one game client, the additional game input indicating additional actions by at least one game character involved in the new game session.

13. The method as recited in claim 11, wherein a given game session involves at least one game character acting within a game universe along a game session timeline, wherein at least one game character in a given game session is controlled by player input to a game client instance on a client device.

14. The method as recited in claim 11, wherein the game system is configured to support multiplayer game play, wherein the previously played game session involves two or more game characters, wherein a given game character in a game session corresponds to one of two or more players, and wherein at least one of the two or more game characters in the previously played game session was controlled by respective player input to a game client instance on a client device.

15. The method as recited in claim 11, wherein the previously played game session is replayed from a previously stored game record, the method further comprising generating and storing a new game record for the new game session.

16. The method as recited in claim 11, further comprising storing a plurality of game records corresponding to a plurality of recorded game sessions, wherein the previously played game session is replayed from a selected one of the plurality of game records.

17. The method as recited in claim 11, further comprising displaying, to a game client, a hierarchical listing of previously recorded game sessions corresponding to a plurality of stored game records, wherein the hierarchical listing indicates one or more original game sessions and, for at least one original game session, one or more descendent game sessions spawned from the respective original game session.

18. The method as recited in claim 11, wherein said input from the game client indicates that a first player is assuming control of the respective game character in the game session being replayed using a client device that implements the game client.

19. The method as recited in claim 18, further comprising receiving additional input from another game client, said additional input indicating that a second player is assuming control of another game character in the new game session using a client device that implements the other game client.

20. The method as recited in claim 18, further comprising streaming a view of game play in the new game session from the perspective of another game character to another game client, wherein the other game client does not assume control of the other game character.

21. The method as recited in claim 11, wherein said replaying comprises streaming a plurality of views of the game session to a plurality of game clients on a plurality of client devices, wherein at least two of the views each correspond to a perspective of a different game character associated with the respective client device.

22. A non-transitory computer-accessible storage medium storing program instructions computer-executable to implement a game system configured to:
　record and store game records for one or more game sessions each involving one or more game characters acting within a game universe along a game session timeline;
　play back at least a portion of a game session from a selected one of the game records to one or more game clients;
　receive input from one of the one or more game clients during said play back of the game session, said input indicating that the game client is assuming control of one of the one or more game characters in the game session being played back; and
　in response to said input, spawn a new game session from the game session being played back, wherein a timeline of the new game session diverges from a timeline of the game session as recorded in the respective game record.

23. The non-transitory computer-accessible storage medium as recited in claim 22, wherein the game system is further configured to generate and store a new game record for the new game session.

24. The non-transitory computer-accessible storage medium as recited in claim 22, wherein the game system is further configured to receive additional input from another one of the one or more game clients subsequent to said spawn, said input indicating that the other game client is assuming control of another game character in the new game session.

25. The non-transitory computer-accessible storage medium as recited in claim 22, wherein the game system is configured to support multiplayer game play, wherein the game session being played back involves two or more game characters each corresponding to a different one of two or more players.

26. The non-transitory computer-accessible storage medium as recited in claim 22, wherein the one or more game characters in the game session being played back each correspond to a different one of one or more players, and wherein the one or more game clients to which the game session is played back are implemented on one or more client devices associated with the one or more players.

* * * * *